(12) United States Patent
Yoshimura et al.

(10) Patent No.: US 7,263,064 B2
(45) Date of Patent: Aug. 28, 2007

(54) PACKET COMMUNICATION SYSTEM WITH PACKETS CLASSIFICATION, DIVISION AND RETRANSMISSION

(75) Inventors: Takeshi Yoshimura, Yokohama (JP); Toshiro Kawahara, Tsuyama (JP); Minoru Etoh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 953 days.

(21) Appl. No.: 10/087,792

(22) Filed: Mar. 5, 2002

(65) Prior Publication Data

US 2002/0126675 A1 Sep. 12, 2002

(30) Foreign Application Priority Data

Mar. 6, 2001 (JP) .............................. 2001-062606

(51) Int. Cl.
*H04L 12/26* (2006.01)
(52) U.S. Cl. ..................................................... 370/235
(58) Field of Classification Search ........ 370/229–236, 370/276–282, 310, 389, 392, 394, 395.2, 370/395.21, 395.43; 709/227, 229–235
See application file for complete search history.

(56) References Cited

U.S. PATENT DOCUMENTS

| | | | |
|---|---|---|---|
| 5,638,371 A * | 6/1997 | Raychaudhuri et al. | 370/310.2 |
| 5,684,791 A * | 11/1997 | Raychaudhuri et al. | 370/310.2 |
| 5,768,527 A | 6/1998 | Zhu et al. | |
| 6,085,252 A | 7/2000 | Zhu et al. | |
| 6,452,915 B1 * | 9/2002 | Jorgensen | 370/338 |
| 6,490,248 B1 * | 12/2002 | Shimojo | 370/229 |
| 6,577,596 B1 * | 6/2003 | Olsson et al. | 370/230 |
| 6,658,021 B1 * | 12/2003 | Bromley et al. | 370/466 |

(Continued)

FOREIGN PATENT DOCUMENTS

EP 0 909 105 4/1999

(Continued)

OTHER PUBLICATIONS

S. Gruhl, et al., "A Demonstrator for Real-Time Multimedia Sessions over 3$^{rd}$ Generataion Wireless Networks", IEEE, vol. 2, XP10513168A, 2000, pp. 959-962.

(Continued)

*Primary Examiner*—Dmitry Levitan
(74) *Attorney, Agent, or Firm*—Oblon, Spivak, McClelland, Maier & Neustadt, P.C.

(57) ABSTRACT

A method for transmitting packets classified according to QoS requirement from a transmitting node to a receiving node is provided, the transmitting node being configured to select sequentially a QoS class, to divide a queued packet to be transmitted, which belongs to the selected class, into a plurality of predetermined data units, to transmit one of the predetermined data units, and to apply a transmitter-side retransmission control process to the data unit to be transmitted when the selected class is a QoS class specified for data type packets, and the receiving node being configured to receive sequentially the data units transmitted from the transmitting node, to assemble a plurality of received data units to restore an original packet for each QoS class, and to apply a receiver-side retransmission control process to the received data units when the received data unit belongs to one of the data type QoS classes.

24 Claims, 17 Drawing Sheets

U.S. PATENT DOCUMENTS 6,791,982 B2 * 9/2004 Westberg .................... 370/392

FOREIGN PATENT DOCUMENTS

| EP | 0 984 641 A2 | 3/2000 |
| --- | --- | --- |
| EP | 1 030 484 A2 | 8/2000 |
| JP | 8-163139 | 6/1996 |
| JP | 8-223217 | 8/1996 |
| JP | 9-205461 | 8/1997 |
| JP | 2000-224261 | 8/2000 |
| JP | 2000-316021 | 11/2000 |
| JP | 2000-341757 | 12/2000 |
| WO | WO96/19882 | 6/1996 |
| WO | WO 00/10334 | 2/2000 |
| WO | WO 00/10357 | 2/2000 |
| WO | WO 00/65743 | 11/2000 |

OTHER PUBLICATIONS

George C. Polyzos, "Enhancing Wireless Internet Links for Multimedia Services", Proceedings of the Momlic, XP002273077, Oct. 1998, pp. 1-6.

* cited by examiner

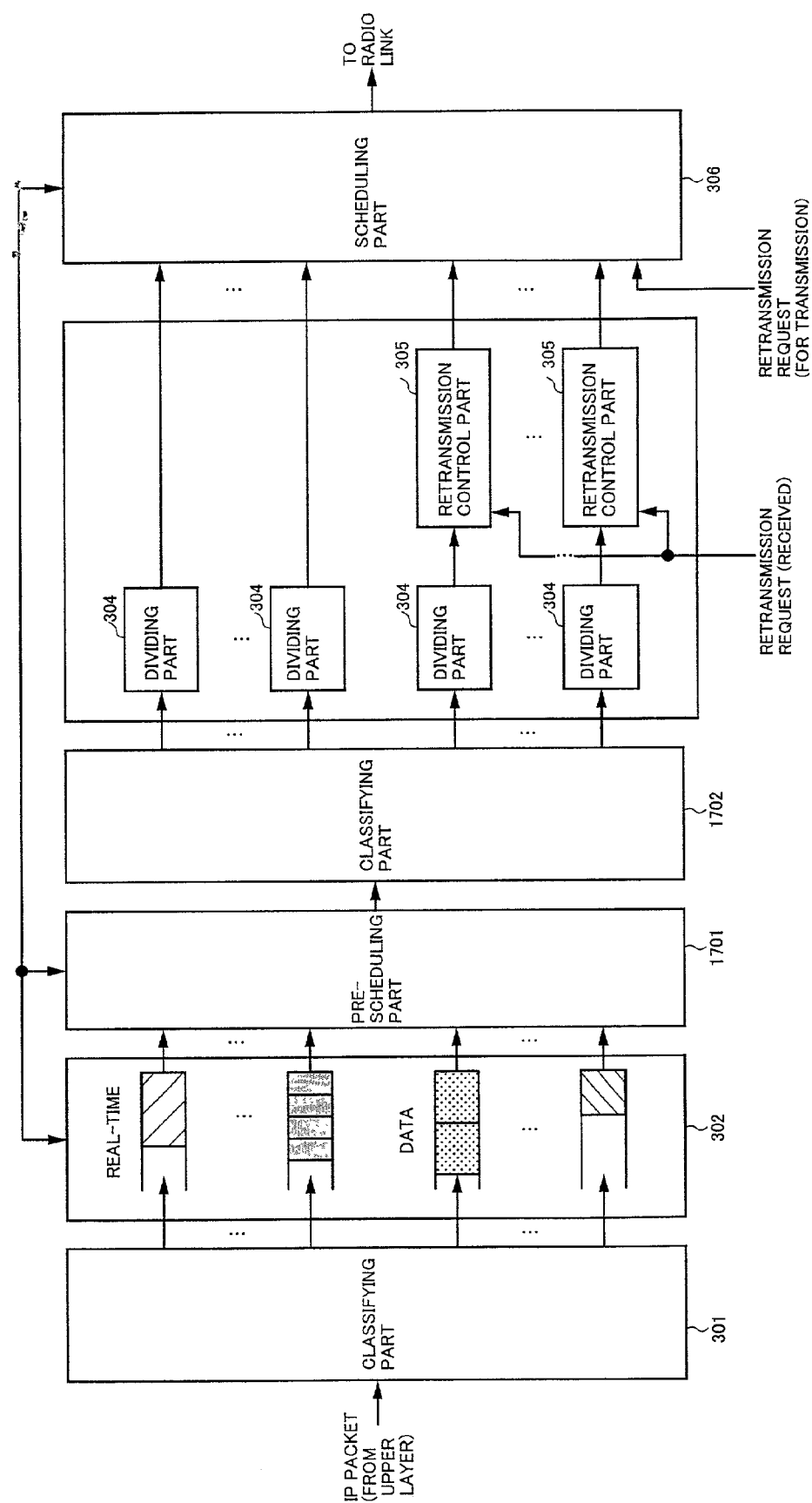

PACKET COMMUNICATION SYSTEM WITH PACKETS CLASSIFICATION, DIVISION AND RETRANSMISSION

BACKGROUND OF THE INVENTION

1. Field of the Invention

The present invention generally relates to a packet transmission method and-system, more particularly to the packet transmission method and system for dividing a normal transmission packet into a plurality of data units each having a shorter data length, and scheduling transmission order of those data units.

2. Description of the Related Art

Today, on the Internet, services have been provided that can support various quality of service (QoS). QoS may be defined by allowable packet loss, allowable delay time, and the like.

For example, between transmission of E-mail and transmission of audio or video streaming, there is a big difference in the required QoS. In data type transmission such as for E-mail or Web pages, it may be more important to ensure an arrival of all the information (reliability or low bit error) than an arrival with no or minimal delay. That is, the data type transmission may allow some delay if necessary for the reliability. While, in real-time type transmission such as for audio or video streaming, minimal delay is more important because the real-time type data can be practically unusable if the delay is too large.

Some architectures offer different QoS such as Intserv (Integrated Service) and Diffserv (Differentiated Service). The Intserv guarantees throughput for every QoS class, which is a so-called bandwidth-guaranteed type service, and utilizes RSVP (Resource Reservation Protocol). The Diffserv sets up a priority for every packet, based on user (IP address) or contents of transmitted information.

A conventional packet transmission method and system is described below with reference to FIG.1. FIG.1 schematically shows the configuration of the conventional packet transmitting apparatus.

In FIG. 1, a classifying part 101 processes packets (IP packets) to be transmitted to classify them on the basis of QoS requirement. It is assumed as an example that roughly there are some service classes classified as real-time type and some service classes classified as data type.

Alternatively, for classifying, a different service class is assigned to each flow if this node is an RSVP router, while service classes are allocated based on DSCP (Diffserv Codepoint) in IP header if the node is a Diffserv router.

Each classified transmission packet is managed in an IP datagram queue, using various buffer management techniques for each queue. As an example, some packets are dropped according to a predetermined discard policy such as RED (Random Early Detection) or RIO (RED with In/Out). The IP datagram queues are provided for each service class in an IP queue 102.

A transmission order for the packets to be transmitted buffered in each queue is scheduled by a scheduling part 103 according to a scheduling technique such as PQ (Priority Queuing), WFQ (Weighted Fair Queuing), or CBQ (Class-based Queuing). The scheduling may be based on allocated bands in case of the above-mentioned Intserv, while it may be based on the priority of each queue in case of the above Diffserv. Anyway, a front packet in each queue is pulled out according to one of the above techniques, and is transferred into a data link layer (the second layer).

The packets to be transmitted transferred into the data link layer are transmitted by a data link control part 104.

As described above, the conventional packet transmitting apparatus performs the QoS control by scheduling the packets to be transmitted in the IP layer on the basis of the QoS class.

However, the above conventional QoS control assumes the use of wired transmission where fine connections are maintained, and performs the same process to each QoS class in the data link layer (the second layer).

If such QoS control method is applied to radio transmission where packet losses may likely occur in radio paths, a larger delay may adversely occur in the real-time type packets requiring minimal delay. It is described as below.

With reference to FIG. 2, the configuration of a typical mobile communication system is now described. FIG. 2 shows schematically the whole configuration of the typical mobile communication system.

In FIG. 2, a plurality of radio network controllers (RNC) 202 are connected to a core network (CN) 201, and each radio network controller 202 controls a plurality of base stations (BS) 203. Each radio base station 203 manages a plurality of cells 204. The number of each kind of stations shown is only an example and may include others.

In the mobile communication system, the data link control is usually performed in the RNC 202.

In the mobile communication system having such configuration, when the packet loss occurs, the same packet is usually retransmitted in the radio path in order to maintain the quality of transmission. With a typical control, when one packet is lost in the radio path, a receiver-side awaits the retransmission of the lost packet even if the subsequent packet is successfully transmitted.

As mentioned above, since reliability (low bit error) is important in the transmission of the data type packets, a process required for the retransmission control is applied to each of the packets to be transmitted in the data link control.

However, applying the data link control including the retransmission control uniformly to all the packets belonging to all QoS classes, consequently the retransmission control is applied to the real-time type packets.

In the radio transmission, particularly the retransmission control is frequently performed. Therefore, applying the above conventional QoS control to the radio transmission, the transmission delay may likely occur in the transmission of the real-time type packets where minimal delay may be more important than the reliability.

Also, transmission rate in the radio transmission is slower than one in the wired transmission, and hence longer packet transmission time is required in the former than in the latter. For example, when a packet having 1,500 bytes is transmitted at 128 kilobit per second (kbps), it takes approximately 100 milliseconds (ms). In audio or voice communication, 100 ms delay is quite large.

Therefore, when a real-time type packet is to be transmitted during the transmission of the data type packet, according to the above example, even if the scheduling process is performed taking account of QoS (i.e. the real-time type packet shall be given higher priority for transmission), this real-time type packet waits to be transmitted at most for 100 ms.

Thus, in the conventional data link control apparatus, the QoS control is exclusively performed in the IP layer (the third layer), and the QoS is not adequately reflected in the process of the data link layer (the second layer).

Therefore, the conventional packet transmitting apparatus has a problem that the transmission delay is likely to occur in the real-time type packets when it is used for the radio transmission.

Japanese laid-open patent application No. 2000-224261 discloses a data link control method in which a plurality of QoS planes are generated in the data link layer on the basis of the QoS information of the IP layer.

In this method, in fact, the data link control varies according to the QoS. However, although this method varies its retransmission method on the basis of the QoS requirement, the above-mentioned problem that the delay may occur in the real-time type packets due to the occurrence of the retransmission packet waiting time remains, because this method does not include a mode that does not perform the retransmission method.

Also, in this method, although a frame length to divide into is varied in the data link layer according to conditions of the radio transmission path, a frame by frame scheduling is not performed. Therefore, this method does not solve the problem that delay may occur in the real-time type packets because of the transmission waiting time until completion of transmission of the data type packets.

SUMMARY OF THE INVENTION

The present invention is directed toward solving these problems, and hence its object is to provide the packet transmission method and system that performs the data link control taking into account the QoS in order to achieve minimal delay of the real-time type packets in the radio transmission, while maintaining the reliability of the data type packets.

According to one aspect of the present invention, a packet transmission system transmits packets classified according to QoS requirement from a transmitting node to a receiving node. The transmitting node includes: a dividing part provided for each QoS class for dividing a packet to be transmitted into a plurality of predetermined data units in each QoS class; a transmitter-side retransmission control part for applying a transmitter-side retransmission control process in each QoS class to the data unit that belongs to one of QoS classes specified for data type packets and is one of the data units obtained from the dividing part; and a scheduling part for selecting a data unit to be transmitted from a set of data units including a data unit that belongs to one of QoS classes not specified for data type packets and is obtained from the dividing part, and a data unit that belongs to one of the QoS classes specified for data type packets and is obtained from the transmitter-side retransmission control part, and transmitting the selected data unit. The receiving node includes: a receiver-side retransmission control part for applying a receiver-side retransmission control process in each QoS class to the data unit that belongs to one of the QoS classes specified for data type packets and is one of the received data units; an assembling part for assembling in each QoS class the data units that belong to one of the QoS classes not specified for data type packets and are some of the received data units, and the data units that belong to one of the QoS classes specified for data type packets and are obtained from the receiver-side retransmission control part to decompress the original packet.

According to another aspect of the present invention, a packet transmission system transmits packets classified according to QoS requirement from a transmitting node to a receiving node. The transmitting node includes: a first pre-scheduling part for selecting classes having high priority for transmission from QoS classes specified for data type packets; a second pre-scheduling part for selecting classes having high priority for transmission from QoS classes not specified for data type packets; a first dividing part for dividing a queued packet to be transmitted belonging to the QoS class selected by the first pre-scheduling part into a plurality of predetermined data units; a second dividing part for dividing a queued packet to be transmitted belonging to the QoS class selected by the second pre-scheduling part into a plurality of the predetermined data units; a transmitter-side retransmission control part for applying a transmitter-side retransmission control process to the packet to be transmitted to be divided by the first dividing part; and a scheduling part for selecting either one of the QoS classes specified for data type packets or one of the QoS classes not specified for data type packets to be transmitted, transmitting the data unit obtained from the transmitter-side retransmission control part when the QoS class specified for data type packets is selected, and transmitting the data unit obtained from the second dividing part when the QoS class not specified for data type packets is selected. The receiving node includes: a receiver-side retransmission control part for applying a receiver-side retransmission control process in each QoS class to the data unit that belongs to one of the QoS classes specified for data type packets and is one of the received data units; and an assembling part for assembling the data units that belong to one of the QoS classes not specified for data type packets and are some of the received data units, and the data units that belong to one of the QoS classes specified for data type packets and are obtained from the receiver-side retransmission control part in each QoS class to decompress the original packet.

According to a further aspect of the present invention, a packet transmission system transmits packets classified according to QoS requirement from a-transmitting node to a receiving node. The transmitting node includes: a first scheduling part for determining transmission order for packets to be transmitted; a dividing part provided for each QoS class for dividing the packet to be transmitted of which transmission order is determined by the first scheduling part into a plurality of predetermined data units in each QoS class; a transmitter-side retransmission control part for applying a transmitter-side retransmission control process in each QoS class to the data unit that belongs to one of QoS classes specified for data type packets and is one of the data units obtained from the dividing part; and a scheduling part for selecting a data unit to be transmitted from a set of data units including a data unit that belongs to one of QoS classes not specified for data type packets and is obtained from the dividing part, and a data unit that belongs to one of the QoS classes specified for data type packets and is obtained from the transmitter-side retransmission control part, and transmitting the selected data unit. The receiving node includes: a receiver-side retransmission control part for applying a receiver-side retransmission control process in each QoS class to the data unit that belongs to one of the QoS classes specified for data type packets and is one of the received data units; an assembling part for assembling in each QoS class the data units that belong to one of the QoS classes not specified for data type packets and are some-of the received data units, and the data units that belong to one of the QoS classes specified for data type packets and are obtained from the receiver-side retransmission control part to decompress the original packet.

In this context, the QoS class specified for data packets may be a QoS used for transmission of information such as E-mails or Web pages, that is, a QoS used for transmission that is required to be reliable or to have low bit error and can allow some delay. Also in this context, the QoS class not specified for data packets may be a QoS class specified for real-time packets such as audio or video streaming, that is, a QoS used for transmission that is strongly required to be minimally delayed because it may be unusable when the delay is large.

Further in this context, to transmit a data unit may mean to transmit a data unit being at the front of the queue.

It may be possible to add a header compression process to one of the above aspects to reduce the amount of the transmitted information.

The present invention also includes a packet transmitting/receiving apparatus that may be a communication node, a packet transmitting apparatus that may be provided in the communication node, and a packet receiving apparatus. The present invention further includes a packet transmission method used in the above systems and apparatuses.

BRIEF DESCRIPTION OF THE DRAWINGS

These and other aspects, and other objects, features and advantages of the present invention will become more apparent from the following detailed description when read in conjunction with the accompanying drawings, in which:

FIG. 17 is the schematic diagram showing the configuration of-the packet transmitting apparatus according to the fourth embodiment of the present invention.

DETAILED DESCRIPTION OF THE PREFERRED EMBODIMENTS

As below, the embodiments of the present invention are described with reference to the accompanying figures.

Figure 3:
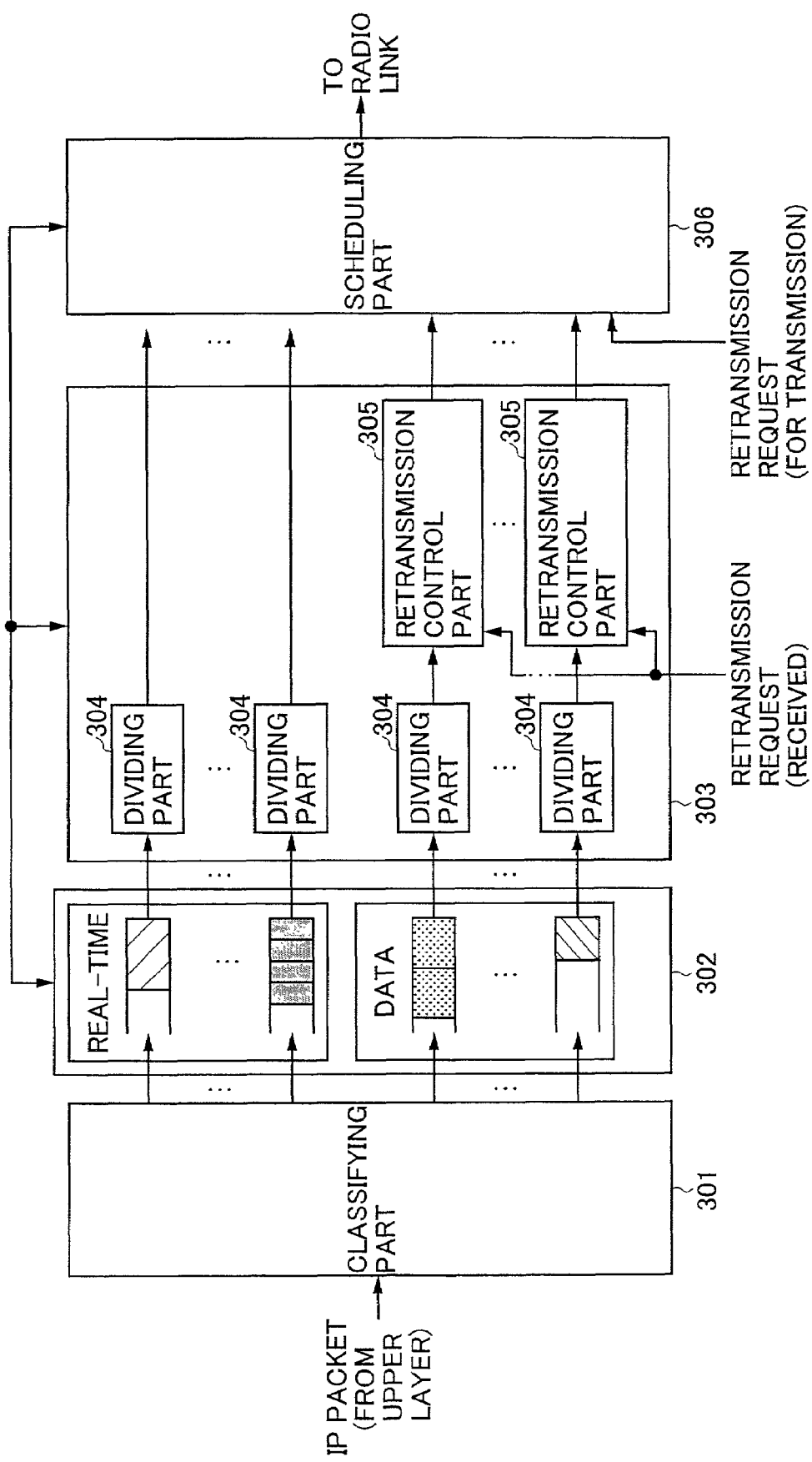
FIG. 3 is the schematic diagram showing the configuration of the packet transmitting apparatus according to the first embodiment of the present invention.
Figure 4:
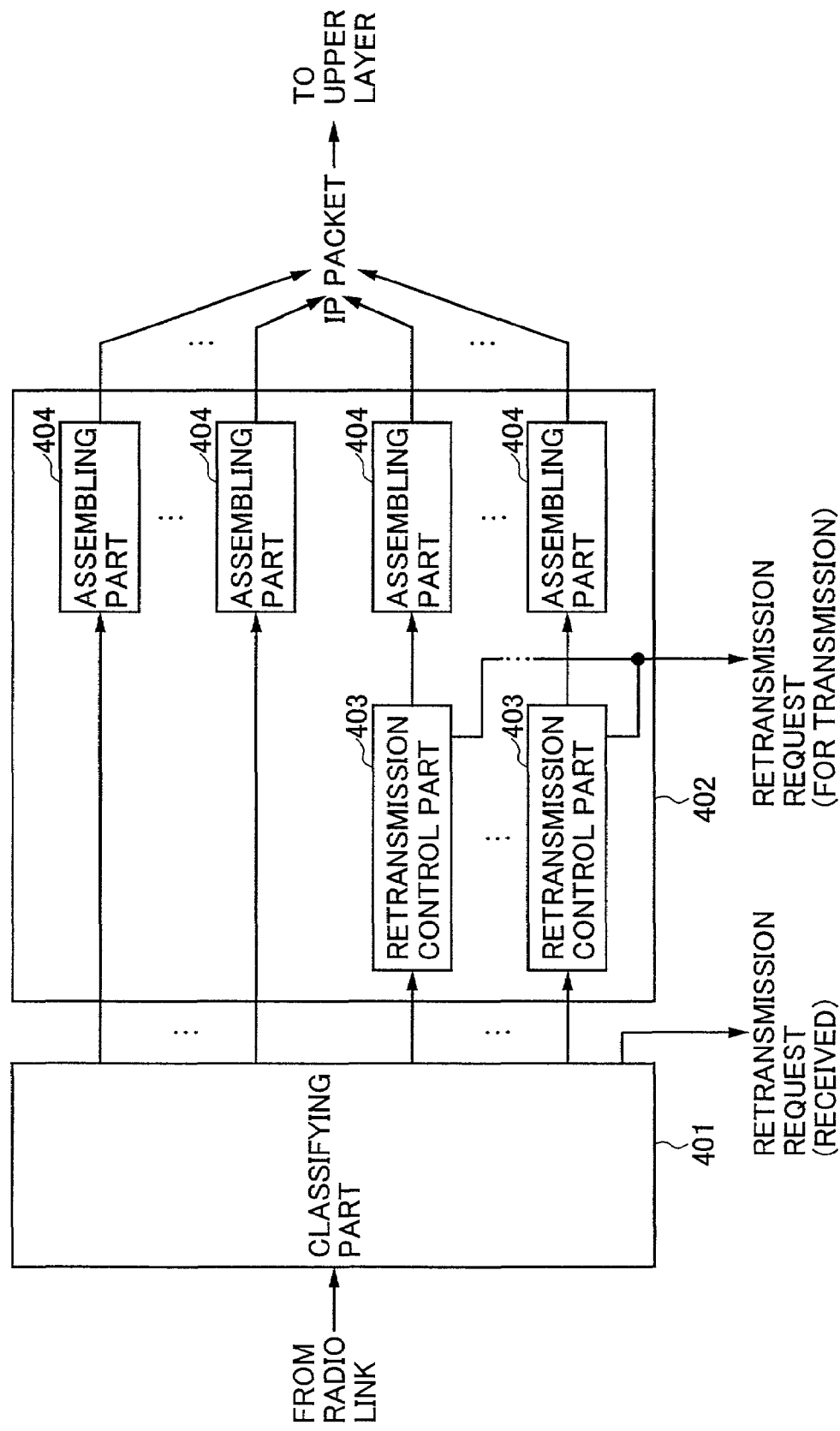
FIG. 4 is the schematic diagram showing the configuration of the packet receiving apparatus according to the first embodiment of the present invention.
Figure 5:
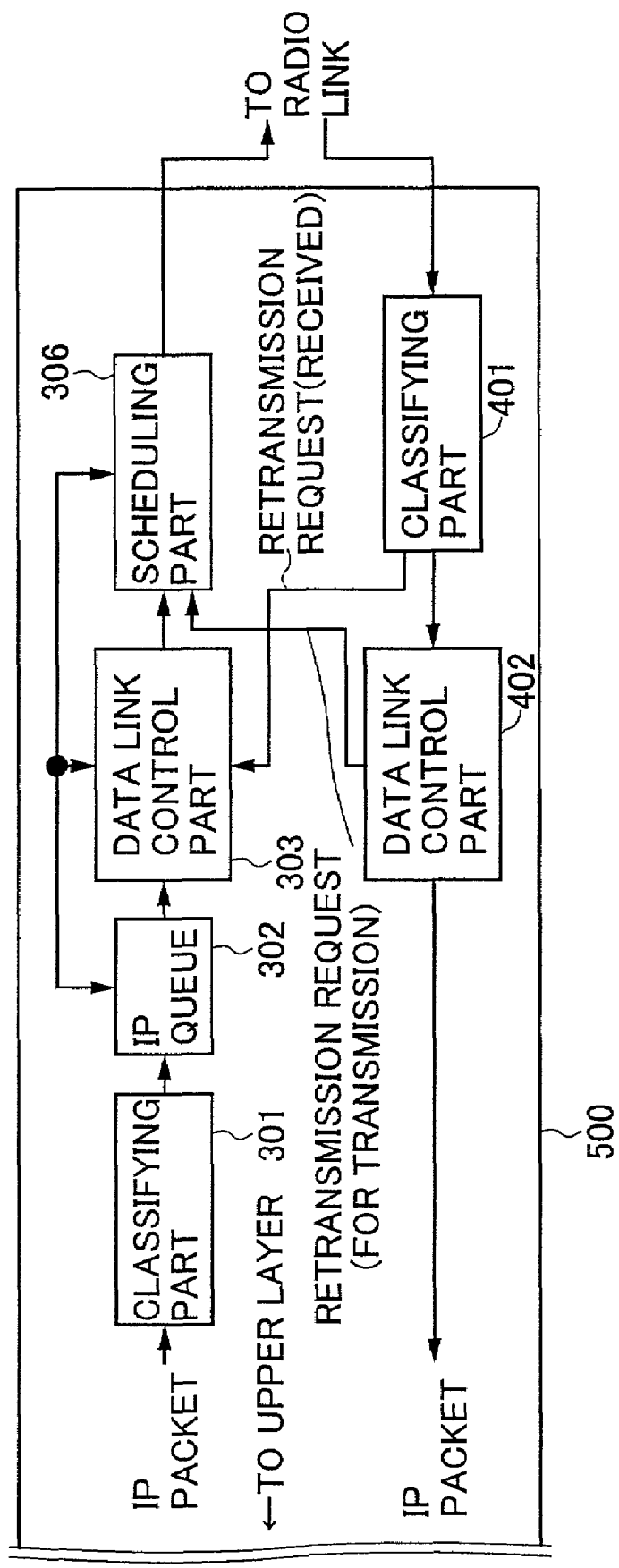
FIG. 5 is the schematic diagram showing the configuration of the packet transmitting/receiving apparatus according to the first embodiment of the present invention.

First, the packet transmitting system according to the first embodiment of the present invention is described with reference to FIGS. 3–5. FIG. 3 shows the configuration of the packet transmitting apparatus according to this embodiment, FIG. 4 shows the configuration of the packet receiving apparatus according to this embodiment, and FIG. 5 shows the configuration of the packet transmitting/receiving apparatus according to this embodiment.

As shown in FIG. 3, the packet transmitting apparatus according to this embodiment includes a classifying part 301, an IP queue 302, a data link control part 303, and a scheduling part 306. The data link control part 303 includes dividing parts 304 and retransmission control parts 305.

The classifying part 301 classifies the IP packets input from an upper layer into different IP datagram queues on the basis of the QoS requirement obtained from, for example, IP header information of the packets.

The IP queue 302 includes a plurality of IP datagram queues, and stores the packets to be transmitted for each QoS class. The IP queue 302 also determines whether the IP packet should be discarded on the basis of the number of queued packets, total length of the queued packets, and the IP header information of the input packet, according to the predetermined arbitrary discard policy.

The dividing part 304 divides each of the packets to be transmitted into a plurality of predetermined data units each having shorter data length than ones of the typical IP packets. The data unit may be, for example, a PDU (Protocol Data Unit) having a fixed length.

The dividing part 304 then writes specification of the dividing process such as the number to divide into, a flag indicating front or tail of the packet, or information about the packet length, into the header of each data unit. The dividing part 304 also writes a sequence number and identification for process line that indicates which dividing part generates this data unit (or identification for QoS class) into the header of each data unit.

The dividing part 304 also includes buffers each storing temporarily the data units generated by dividing one or more packets. The dividing part 304 can store any number of the data units, and the dividing part 304 may buffer as many as possible of the data units in order to make it smooth for the subsequent packet to be transmitted to be input into the IP queue.

The retransmission control part 305 applies a process required for retransmission control to the data unit to be transmitted, and transmits a packet indicated by an opposing communicating station when the opposing communicating station requires packet retransmission. This is detailed later.

The scheduling part 306 selects a QoS class having top priority for transmission at the moment on the basis of an allocated band, the priority of the QoS class, and the like, and transmits a data unit being at the front of the selected class. This selection of the data unit to be transmitted is performed each time, transmitting one data unit. The scheduling part 306 also transmits a retransmission request to be transmitted to the opposing communicating station. This is detailed later.

On the other hand, as shown in FIG. 4, the packet receiving apparatus according to this embodiment includes a classifying part 401 and a data link control part 402. The data link control part 402 includes retransmission control parts 403 and assembling parts 404.

The classifying part 401 classifies the data units received from the radio path to the assembling part 404 or the retransmission control part 403 appropriate for that data unit according to the identification written on the data unit.

The retransmission control part 403 performs the process required for retransmission by, for example, reading out the sequence numbers in the header information of the received data units in turn. If loss is detected, the retransmission control part 403 requests for retransmission of the lost data unit to the opposing communicating station. This is detailed later.

The assembling part 404 includes a buffer storing temporarily the received data units, and assembles a plurality of the data units into the original packet based on their header information. Although the shown assembling part is provided in each process line, the above assembling parts may be integrated into one element if the element can identify in which process line for the data unit or the assembled IP packet is processed (or which QoS class the data unit or the assembled IP packet belongs to).

The retransmission request process is now detailed with reference to FIG. 5. In a packet transmitting/receiving apparatus 500, the classifying part 401 picks up a retransmission request signal among signals received from the opposing communicating station, and outputs the picked up retransmission request signal to the retransmission control part 305 in the data link control part 303 as shown in FIG. 3.

Also as shown in FIG. 4, when the retransmission control part 403 in the data link control part 402 detects a packet loss, the retransmission control part 403 generates a control signal requesting retransmission of the lost packet, and inputs the generated control signal into the scheduling part 306. The scheduling part 306 performs scheduling the input control signal with other data to be transmitted, and transmits the whole scheduled data to the opposing communicating station.

Generally, the packet transmitting/receiving apparatuses according to this embodiment communicating with each other exchange the retransmission request control signals.

Figure 6:
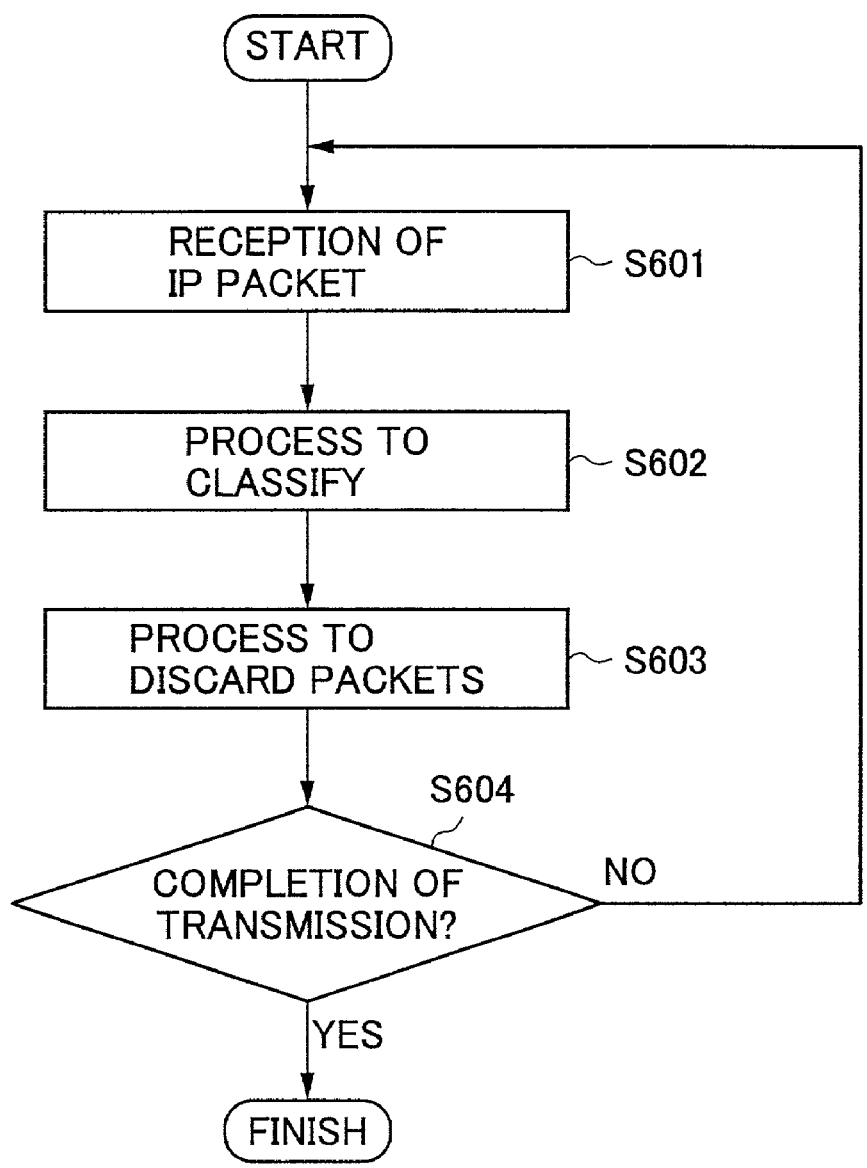
FIG. 6 is a process flow chart of the IP packet to be transmitted in the packet transmitting apparatus according to the first embodiment of the present invention.
Figure 7:
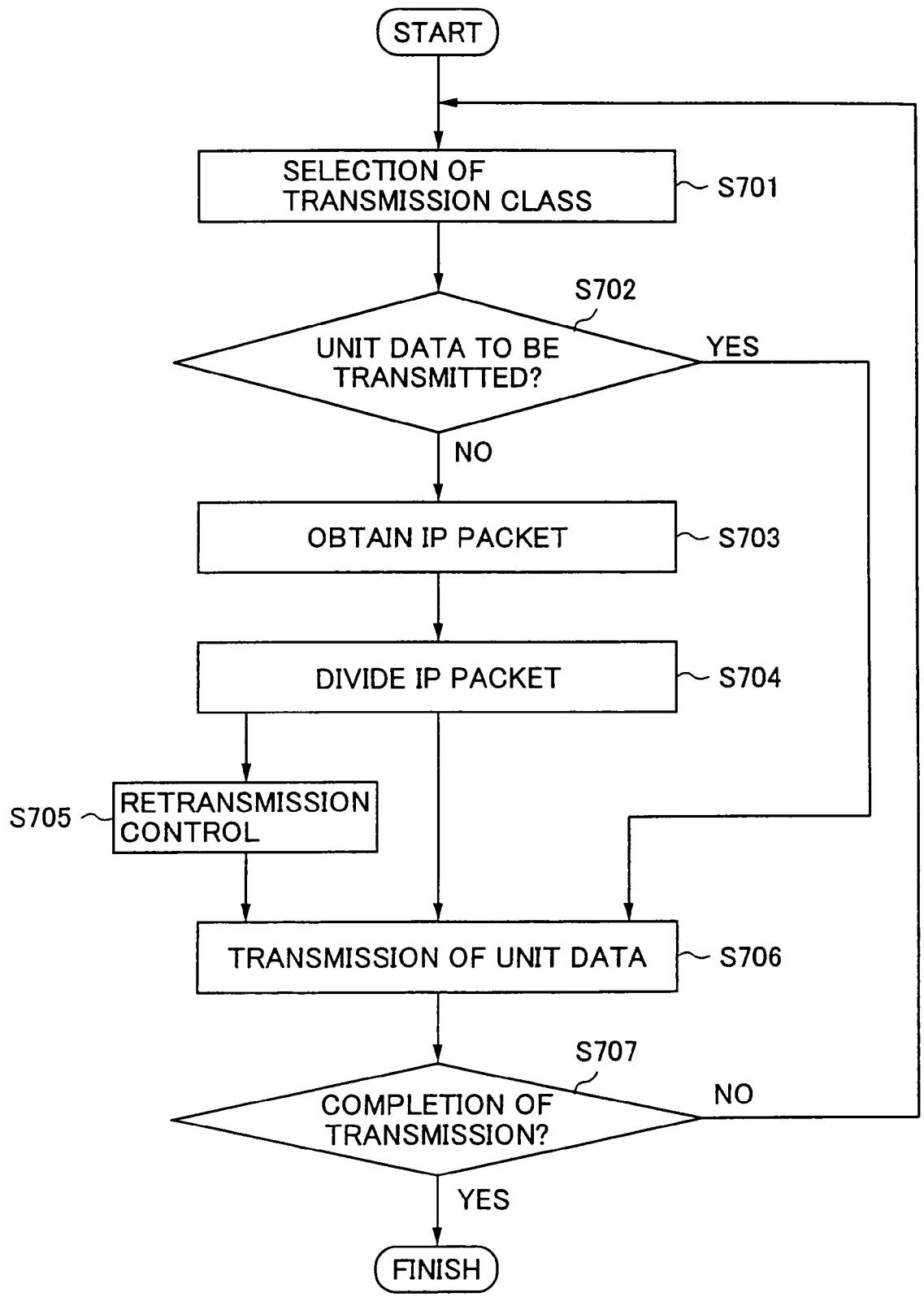
FIG. 7 is a process flow chart of the data unit transmission in the packet transmitting apparatus according to the first embodiment of the present invention.
Figure 8:
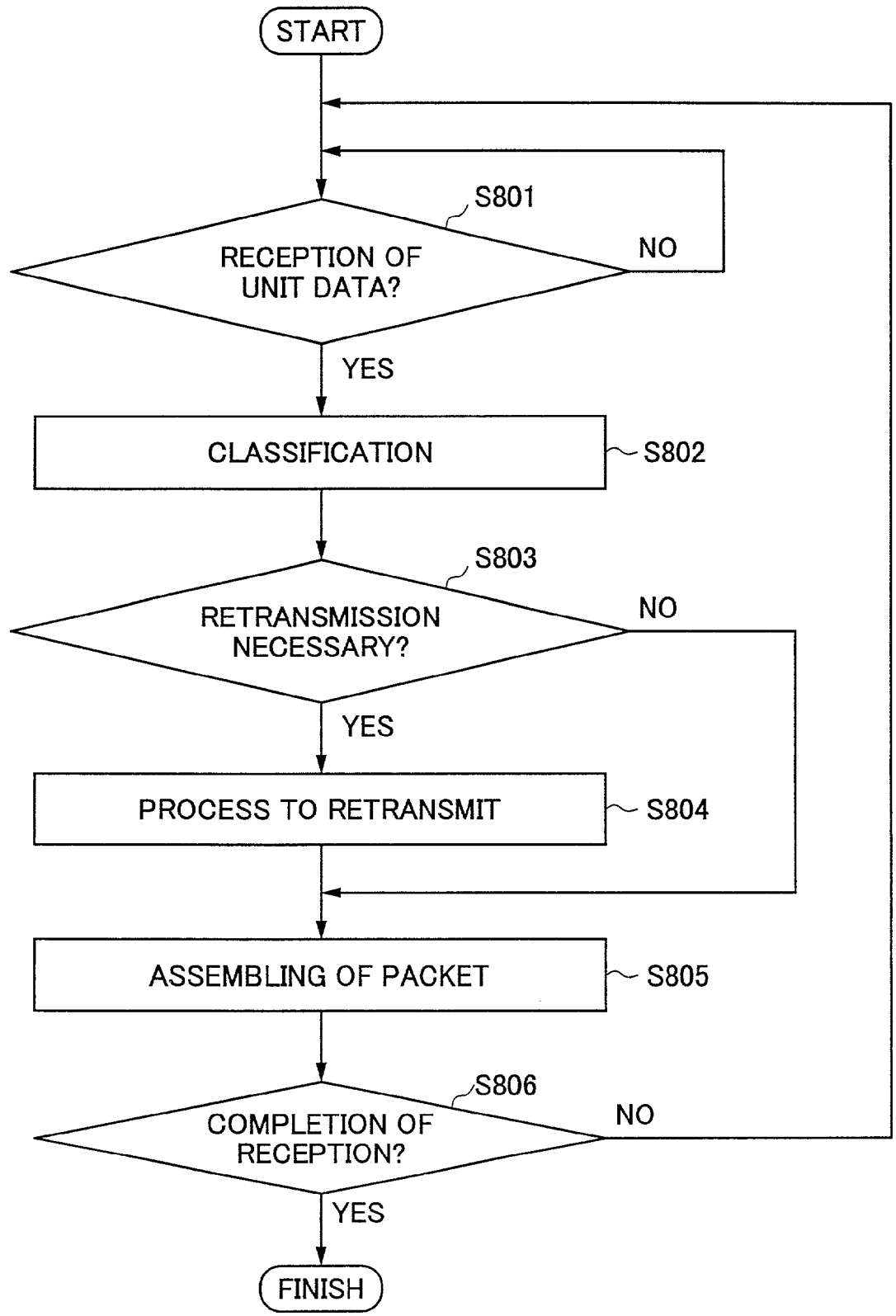
FIG. 8 is a process flow chart of the data unit reception in the packet receiving apparatus according to the first embodiment of the present invention.
Figure 9:
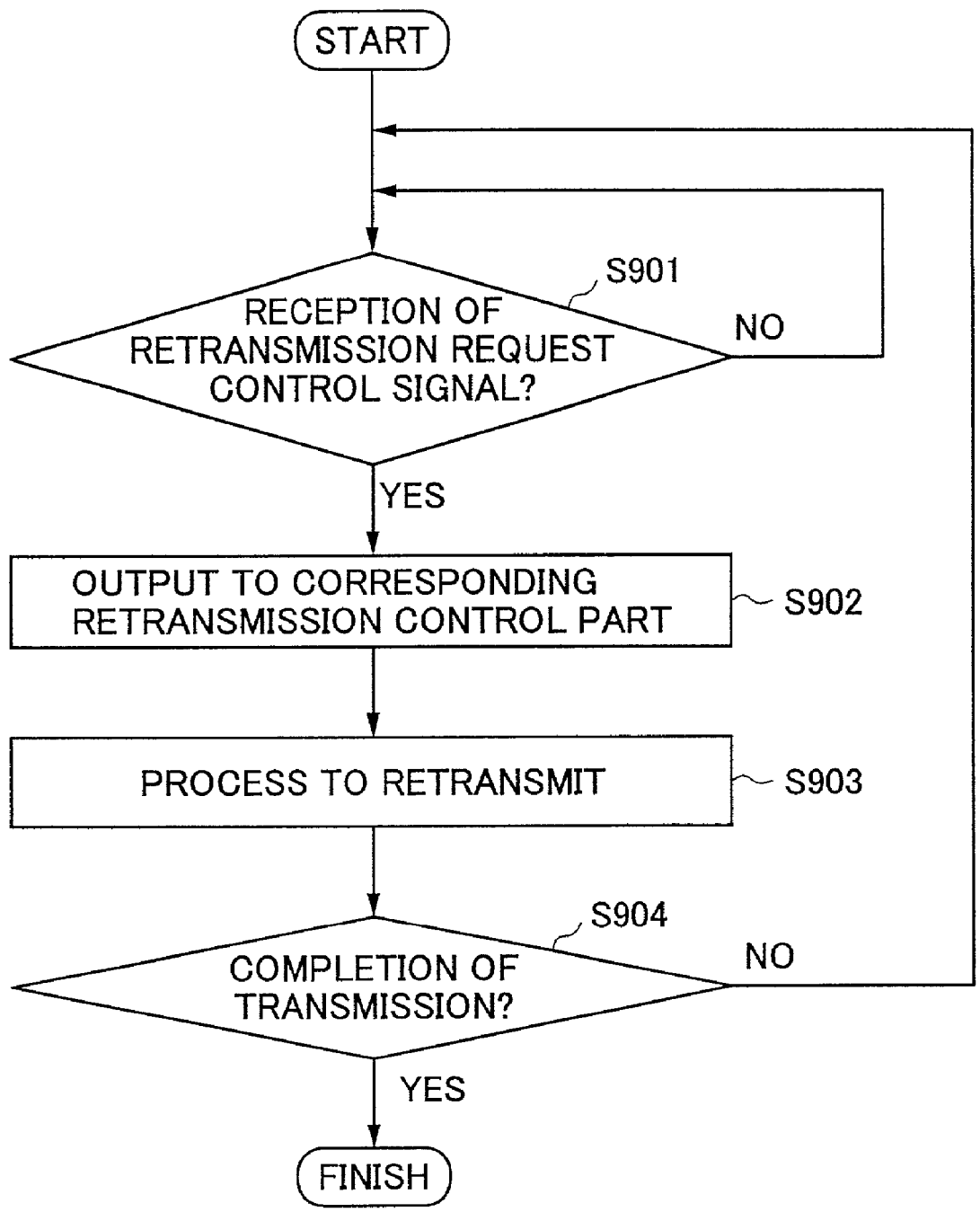
FIG. 9 is a process flow chart of reception of a retransmission request control signal in the packet transmitting apparatus according to the first embodiment of the present invention.

The operation of the packet transmitting system according to this embodiment is then described with reference to FIGS. 6–9 and FIG. 4. FIG. 6 shows the process flow of the IP packet to be transmitted in the packet transmitting apparatus according to this embodiment, FIG. 7 shows the process flow of the data unit transmission in the packet transmitting apparatus according to this embodiment, FIG. 8 shows the process flow of the data unit reception in the packet receiving apparatus according to this embodiment, and FIG. 9 shows the process flow of the reception of the retransmission request control signal in the packet transmitting apparatus according to this embodiment.

First, the process for the IP packet to be transmitted in the packet transmitting apparatus is described with reference to FIG. 6. The packet to be transmitted is input from an upper layer to the data link control apparatus 300 (S601), and is classified and classified by the classifying part 301 according to the QoS requirement from, for example, the IP header information (S602) into each queue in the IP queue 302.

For the IP packet distributed into each queue it is determined whether the IP packet is discarded based on the number of packets stored in a queue, total packet length, the IP header information in the input packet and the like, according to the predetermined arbitrary discard policy.

The process of the data unit transmission in the packet transmitting apparatus is now described with reference to FIG. 7. The scheduling part 306 selects a QoS class having the top priority for transmission at the moment on the basis of the allocated band, the priority of each QoS class, and the like (S701). The selected class is one of the classes queuing the IP packet or the data unit to be transmitted.

The scheduling part 306 determines whether there is a data unit to be transmitted in the dividing part 304 in the process line for the selected class (in case of a real-time type), or in the buffer of the retransmission control part for the selected class (in case of a data type) (S702). If there is the data unit to be transmitted belonging to the selected class ('Yes' at S702), the process proceeds to S706, and that data unit is transmitted. Otherwise, i.e. if there is no data unit to be transmitted belonging to the selected class ('No' at S702), the IP packet belonging to the selected class is pulled out from the IP queue 302 (S703). The pulled out IP packet is divided into a plurality of data units by the dividing part 304 (S704). If the IP packet is a kind of data type packet, the process required for retransmission control is applied to the data unit divided by the dividing process at S704 by the retransmission control part 305 (S705), and a front data unit of the queue is transmitted (S706).

After transmission of one data unit is completed, it is determined whether the whole transmission process is completed (S707). If it is not completed ('No' at S707), the process goes back to S501, and the scheduling part 306 selects a class to be transmitted next. If the whole transmission process is completed ('Yes' at S707), the transmission of the data unit is finished.

The process of the data unit reception in the packet receiving apparatus is now described with reference to FIG. 8. The packet receiving apparatus waits for reception of the data unit (S801 and 'No' at S801), If the data unit is received ('Yes' at S801), the classifying part 401 identifies a class that the received data unit belongs to from the identification in the received data unit, and classifies the received data unit into the corresponding process line (S802).

If the received data unit is a kind of data type ('Yes' at S803), the process required for, retransmission such as detection of lost packet is applied to the data unit by the retransmission control part 403. If necessary, the retransmission request control signal is generated and transmitted to the opposing communicating station.

The data type data unit processed for retransmission and the real-time type data unit are respectively assembled by the respective assembling part 404 based on the header information in the original IP packet.

The assembled IP packet is in turn transferred to the upper layer via, for example, a bus. Since transfer rate at the data link control part 202 is normally slower than one at the bus, it is considered that no packet collision occurs.

Then, if the whole reception process is completed ('Yes' at S806), the process is finished. If the reception process continues ('No' at S806), the process goes back to S801 to wait for the next reception of the data unit.

The process of the reception of the retransmission request control signal in the packet transmitting apparatus is now described with reference to FIG. 9. The packet transmitting apparatus waits for the reception of the retransmission request control signal (S901 and 'No' at S901).

If the retransmission request control signal is received ('Yes' at S901), as shown in FIGS. 3–5, the retransmission request control signal is extracted by the classifying part 401 and is output into the retransmission control part 305 of the appropriate process line for the received retransmission request control signal.

The retransmission control part 305 that receives the retransmission request retransmits the data unit indicated by the retransmission request (S903). Then, if the whole transmission process is completed ('Yes' at S904), the process is finished. If the whole transmission process continues ('No' at S904), the process goes back to S901 to wait for the next reception of the retransmission request control signal.

It is noted that the processes shown in FIGS. 6–9 can be carried out in parallel in order to allow parallel occurrence of events, and are not to be carried out sequentially.

Thus, according to this embodiment, the scheduling process is performed at the data link layer, while the conventional scheduling process is performed at the IP layer that is an upper layer compared to the data link layer. Also, in the data link control process, by dividing each transmission packet into a plurality of shorter data units, and by scheduling the data units, when the real-time type packet comes to be transmitted during transmission of the data type packet, since the length of one unit of transmitted data (that is the above predetermined data unit) is shorter than one of the conventional transmitted packet, the waiting time for a real-time type packet to be transmitted can be reduced.

In other words, even during transmission of the data type IP packet that is relatively large (of which data length is relatively long), the apparatus can start to transmit the real-time type packet that is subject to relatively stringent delay constraints.

Further, according to this embodiment, by reflecting the QoS requirement to the data link control process, by not applying the retransmission control process to the real-time type packet that practically does not require the retransmission process, and by applying the retransmission control process only to the data type packet that requires the retransmission control function, the data processing required in the data link control process can be reduced.

Figure 10:
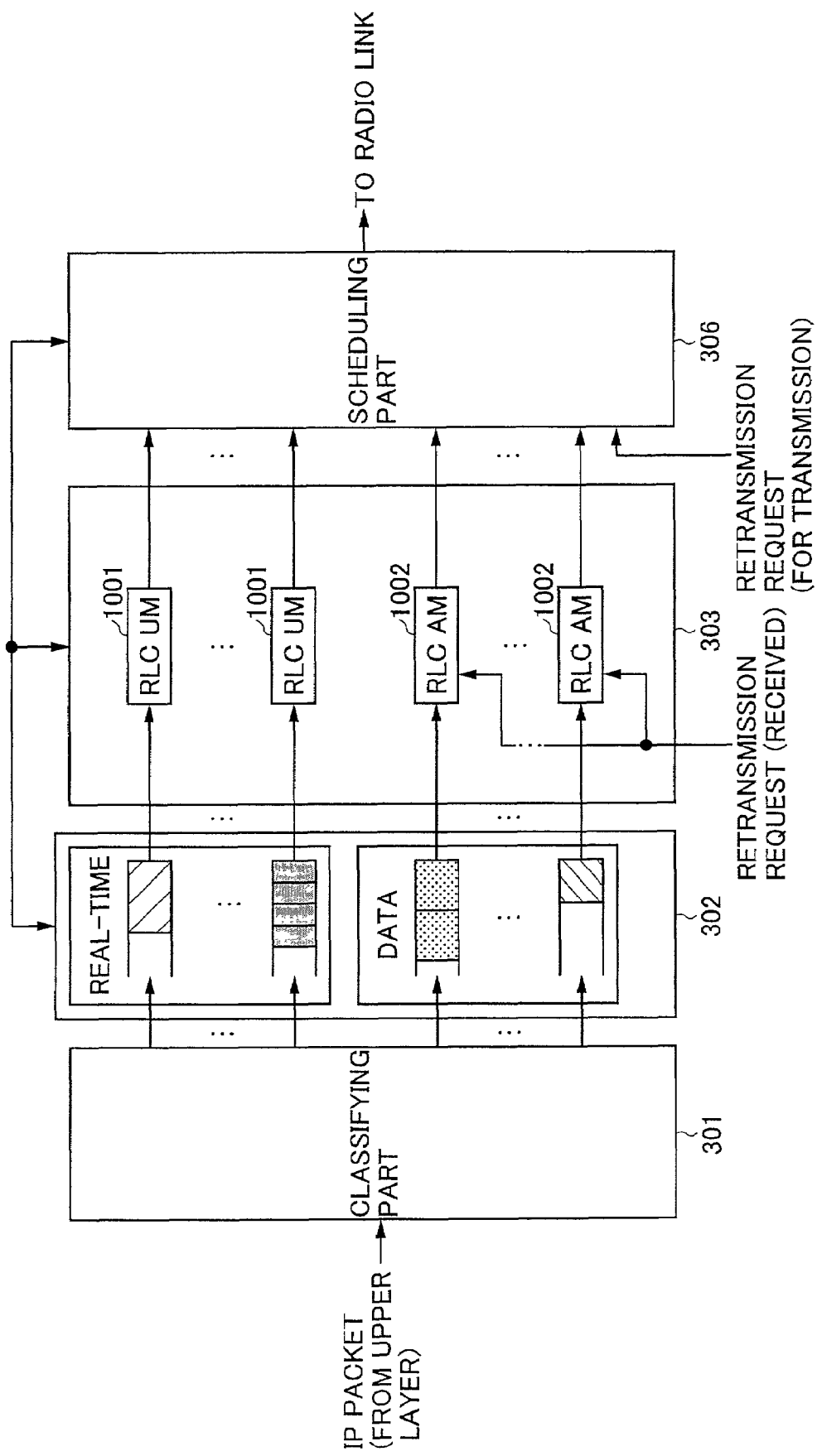
FIG. 10 is a schematic diagram showing an example in which the IMT-2000 (International Mobile Telecommunications 2000) standard is applied to the packet transmitting apparatus according to the first embodiment of the present invention.

An example is now shown in FIG. 10 that the IMT-2000 (W-CDMA) standard is applied to the packet transmitting apparatus according to the first embodiment of the present invention.

As shown, in the data link control part 303, a processing part 1001 processes the real-time type packet, and a processing part 1002 processes the data type packet, where the processing part 1001 achieves RLC UM (Radio Link Control Unacknowledged Mode) that is a transmission control function defined by 3GPP (3rd Generation Partnership Project) and has only a dividing and assembling function, and where the processing part 1002 achieves RLC AM (Radio Link Control Acknowledged Mode) that is also a transmission control function defined by 3GPP and has a dividing and assembling function and a retransmission control function. By employing such configuration, the configuration according to this embodiment is implemented in compliance with the IMT-2000 standard.

Figure 1:
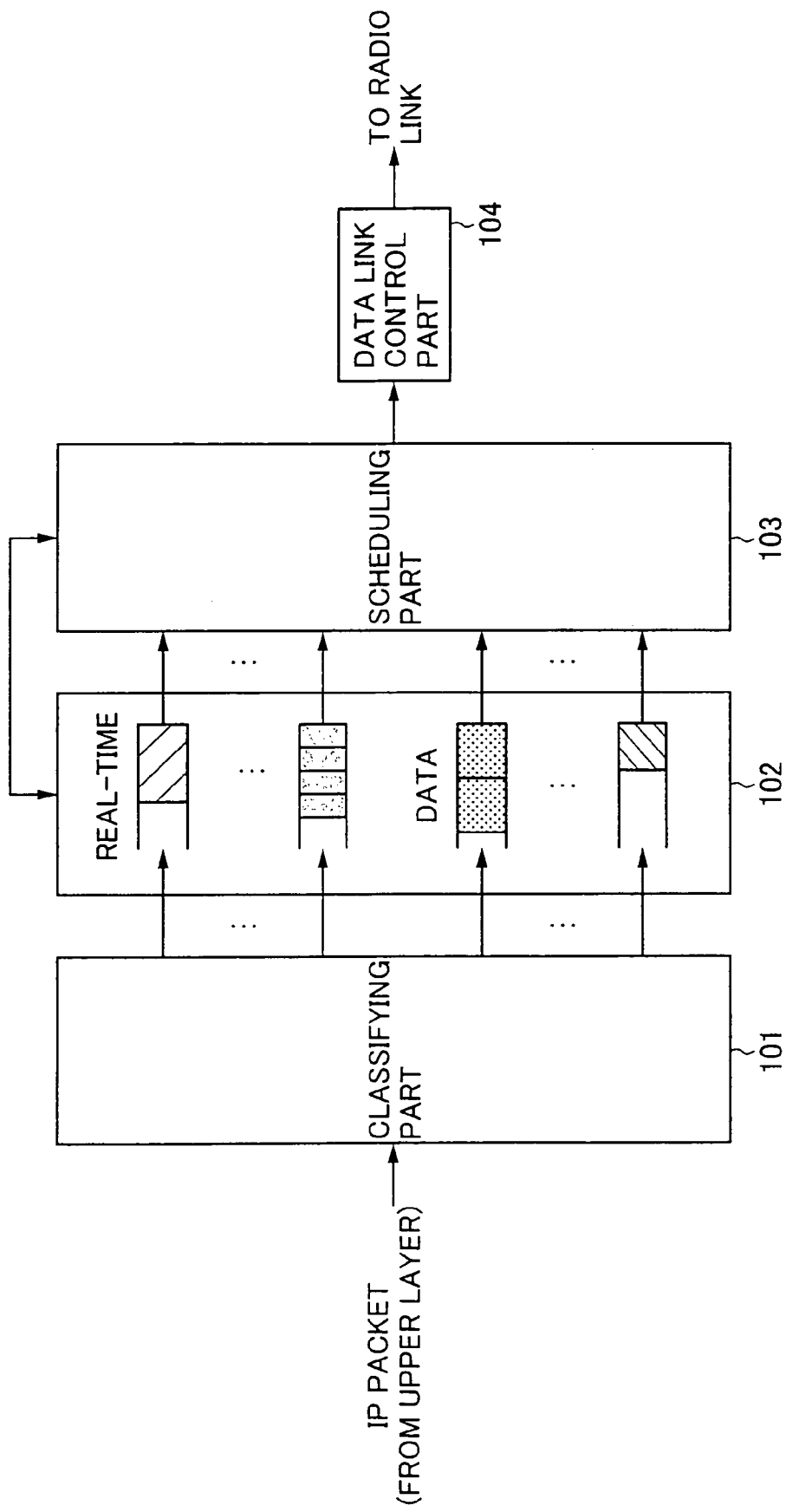
FIG. 1 is the schematic diagram showing the configuration of the conventional packet transmitting apparatus.
Figure 2:
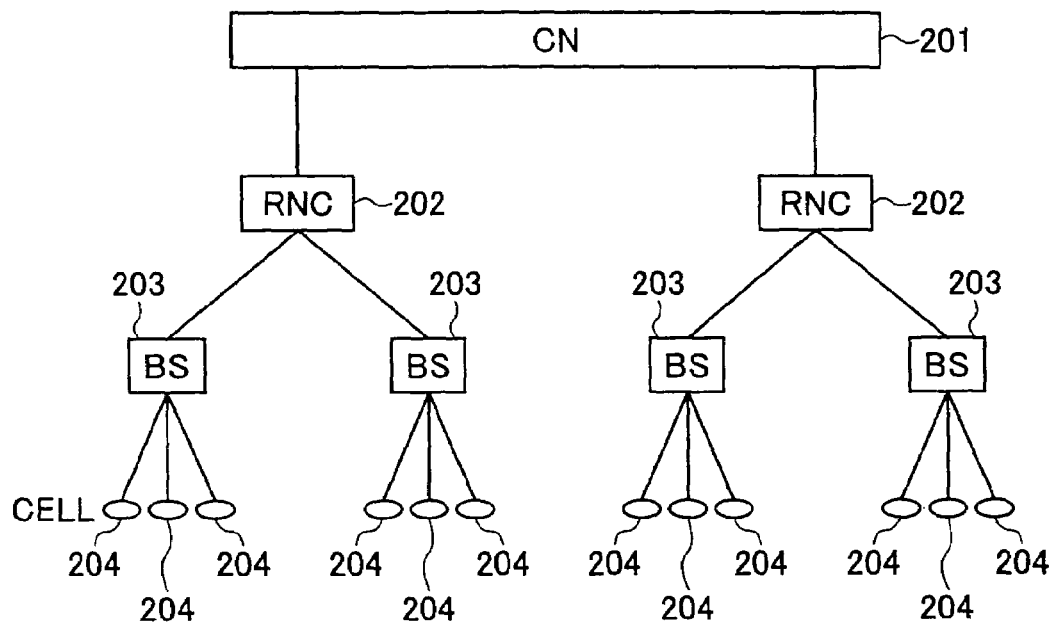
FIG. 2 is the schematic diagram showing the whole configuration of the typical mobile communication system.
Figure 11:
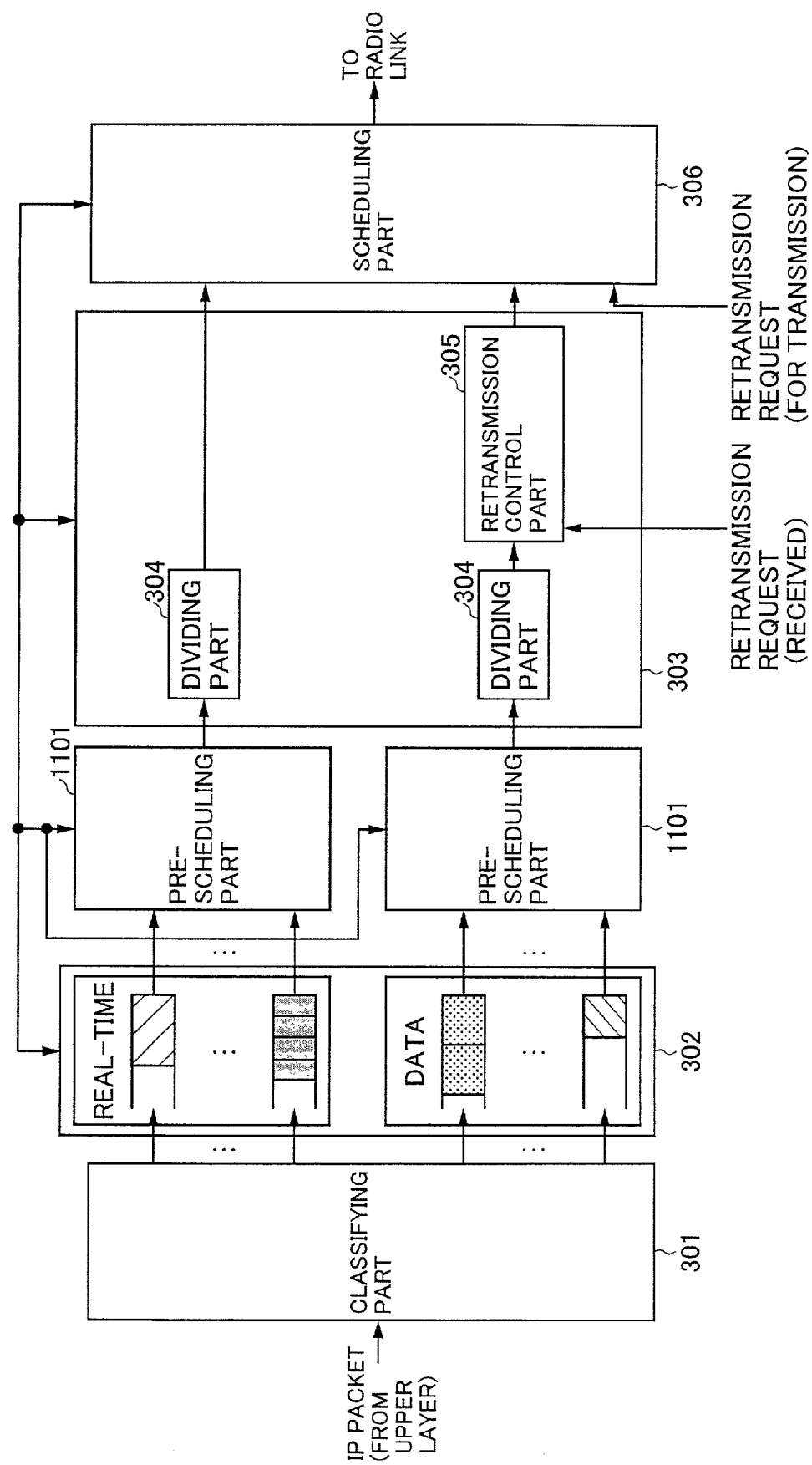
FIG. 11 is the schematic diagram showing the configuration of the packet transmitting apparatus according to the second embodiment of the present invention.
Figure 12:
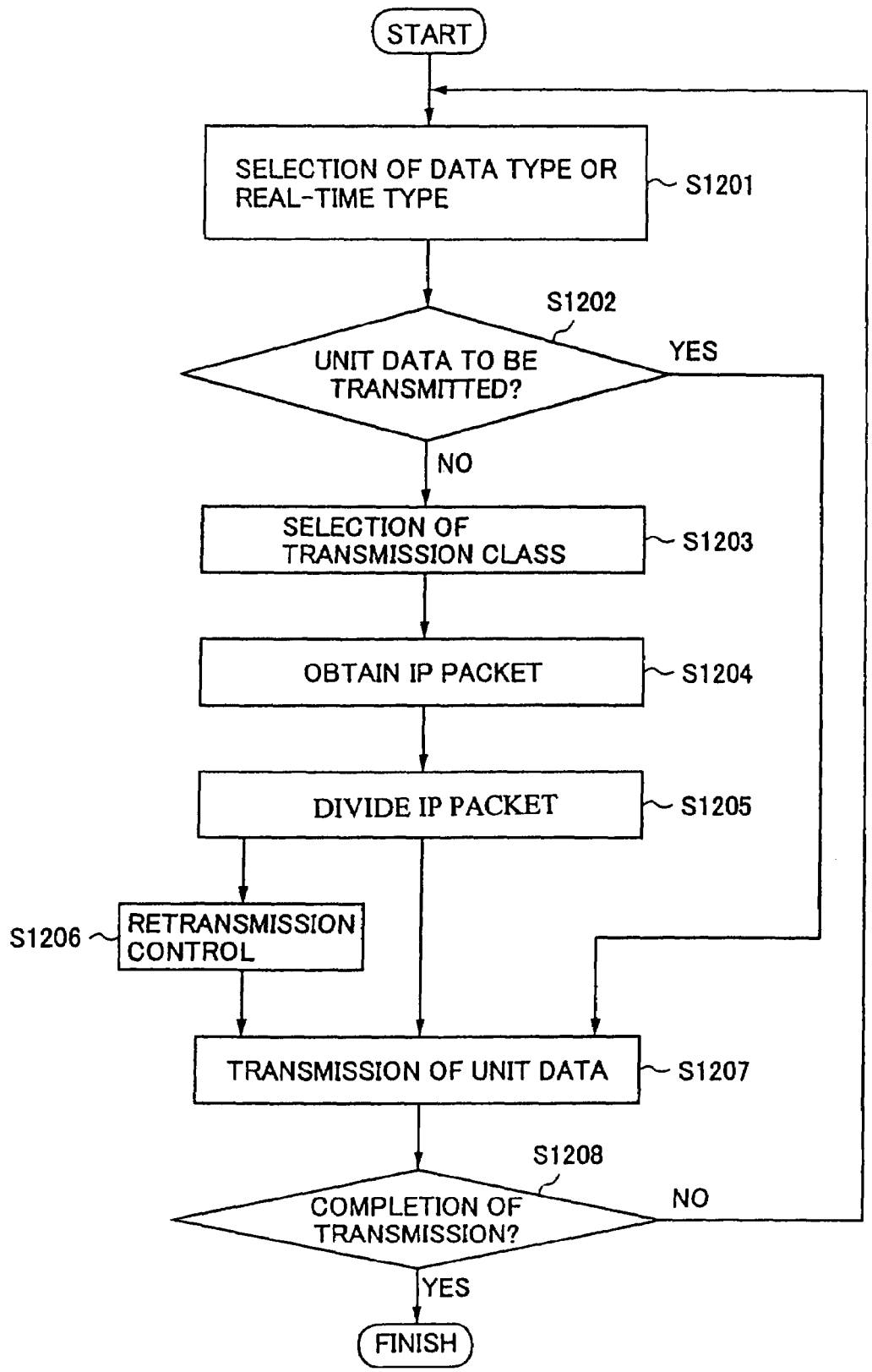
FIG. 12 is a process flow chart of the data unit transmission in the packet transmitting apparatus according to the second embodiment of the present invention.

The packet transmission method and system according to the second embodiment of the present invention is now described with reference to FIGS. 11–12. FIG. 11 shows the configuration of the packet transmitting apparatus according to this embodiment, and FIG. 12 shows the process of the data unit transmission in the packet transmitting apparatus according to this embodiment. The same elements as ones in the packet transmitting apparatus according to the first embodiment shown in FIG. 1 are indicated with the consistent reference numbers, and are not further described in detail.

First, the configuration of the packet transmitting apparatus according to this embodiment is described with reference to FIG. 11. In FIG. 11, two pre-scheduling parts 1101 are provided before the data link control part 303, where one of the two performs the preliminary scheduling process to each packet belonging to one of the real-time type QoS classes based on the QoS requirement, and the other performs the preliminary scheduling process to each packet belonging to one of the data type QoS classes based on the QoS requirement.

The process of the data unit transmission in the packet transmission apparatus according to this embodiment is then described with reference to FIG. 12. The scheduling part 306 selects which type has the top priority for transmission at the moment on the basis of the allocated band, the priority of each QoS class, and the like (S1001).

The scheduling part 306 determines whether there is a data unit to be transmitted for the selected type, with making reference to the buffer of the dividing part 304 when the real-time type is selected and to the buffer of the retransmission control part 305 when the data type is selected (S1202). If there is a data unit to be transmitted in the selected type ('Yes' at S1202), the process proceeds to S1207 and transmits the data unit. If there is no data unit to be transmitted in the selected type ('No' at S1202), the pre-scheduling part 1101 specified for the selected type selects a class having the top priority for transmission at the moment in the selected type on the basis of the allocated band, the priority of each QoS class, and the like (S1203), and pulls out an IP packet belonging to the selected class from the IP queue 302 (S1204). The pulled out IP packet is divided into a plurality of data units by the dividing part 304 (S1205). If the pulled out IP packet is a kind of data type packet, the process required for retransmission control is applied to the data units divided by the dividing process at S1205 by the retransmission control part 305 (S1206), and a front data unit of the queue is transmitted (S1207).

After transmission of one data unit is completed, it is determined whether the whole transmission process is completed (S1208). If it is not completed ('No' at S1208), the process goes back to S1201, and the scheduling part 306 selects a type to be transmitted next. If the whole transmission process is completed ('Yes' at S1208), the transmission of the data unit is finished.

Thus, according to this embodiment, the preliminary scheduling is performed respectively among the data type classes and among the real-time type classes to the packets to be transmitted classified into a plurality of queues based on the QoS requirement before being input into the data link control part 303. Therefore, since only one input flow specified for the real-time type packet and only one input flow specified for the data type packet are provided for the data link control part 303, as shown, only one process line specified for the real-time type packet and only one process line specified for the data type packet are necessary to be provided in the data link control part 303, thereby both the configuration of the data link control part 303 and the data processing required in the data link control part 303 are reduced.

In the case that the dividing parts are provided in each QoS class, the remainder after the dividing into the above predetermined data units each having a fixed length might need to be padded. If there is a subsequent packet in the QoS class, an empty space of the predetermined data unit holding the remainder can be filled with a part of the subsequent packet, however, if there is no subsequent packet in the QoS class, the empty space may have to be filled with 0 bits (so-called padding) to form one complete data unit. In this embodiment, since only one dividing part has to be provided for data type and only one dividing part has to be provided for real-time type, the case that such padding happens is significantly reduced.

Although according to this embodiment the number of the scheduling parts increases, the data processing does not increase because each scheduling part merely outputs the input data selectively based on the predetermined condition. Therefore, although the number of the scheduling parts increases, since too large data processing power is not required and the configuration of the data link control part is simplified, the total data processing is eventually reduced.

The packet transmission method and system according to the third embodiment of the present invention is now described with reference to FIGS. 13–16.

A header in the packet transmission has high compressibility, because the information included in the header may hold the same contents in some cases, and the subsequent value may be easily predicted. In the prior art, it is proposed to compress the header of each packet in the packet transmission in order to reduce an amount of transmitted information. This embodiment applies the header compressing process to the packet transmission system according to the present invention.

Figure 13:
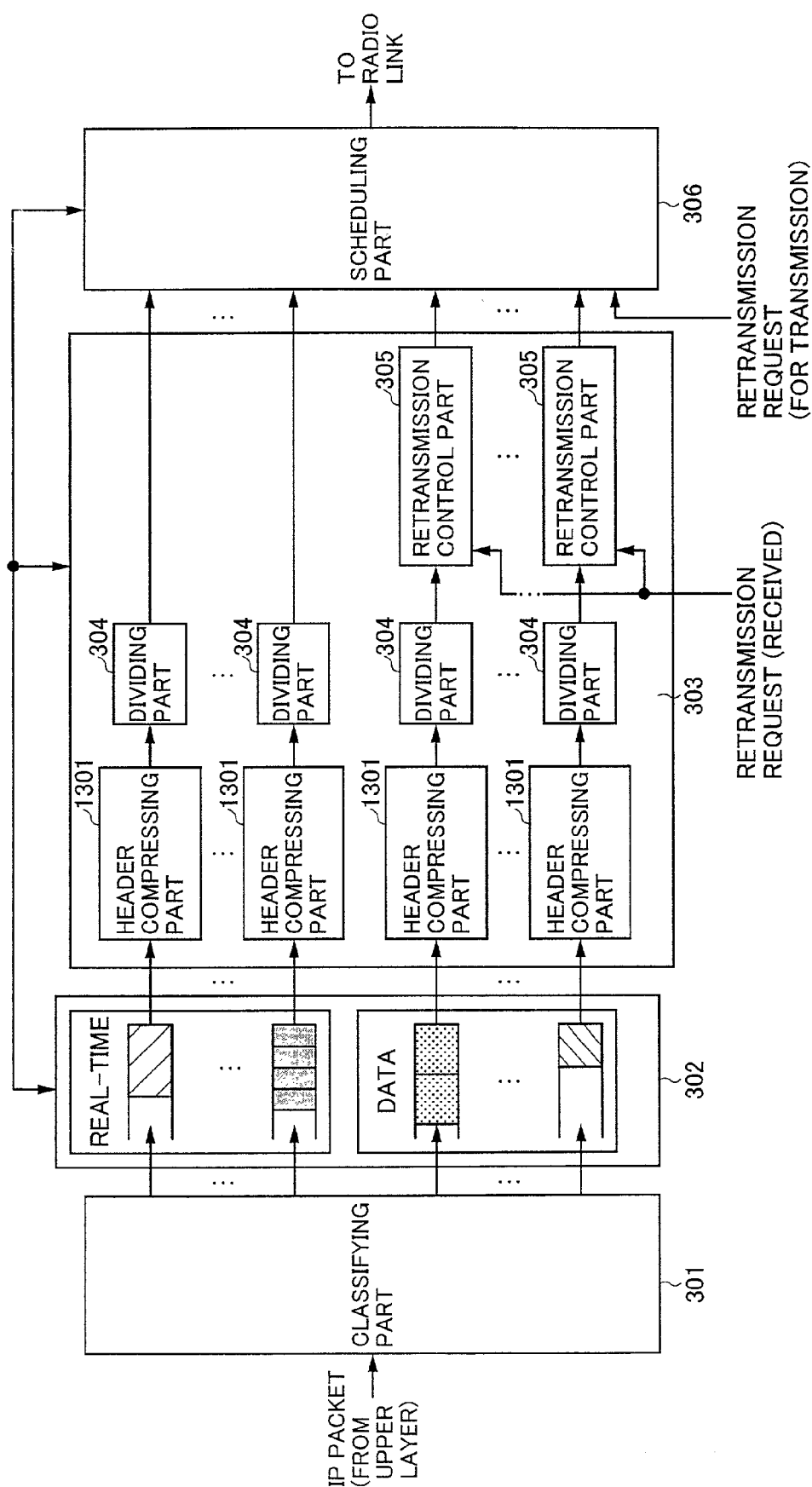
FIG. 13 is the schematic diagram showing the configuration of the packet transmitting apparatus according to the third embodiment of the present invention.
Figure 14:
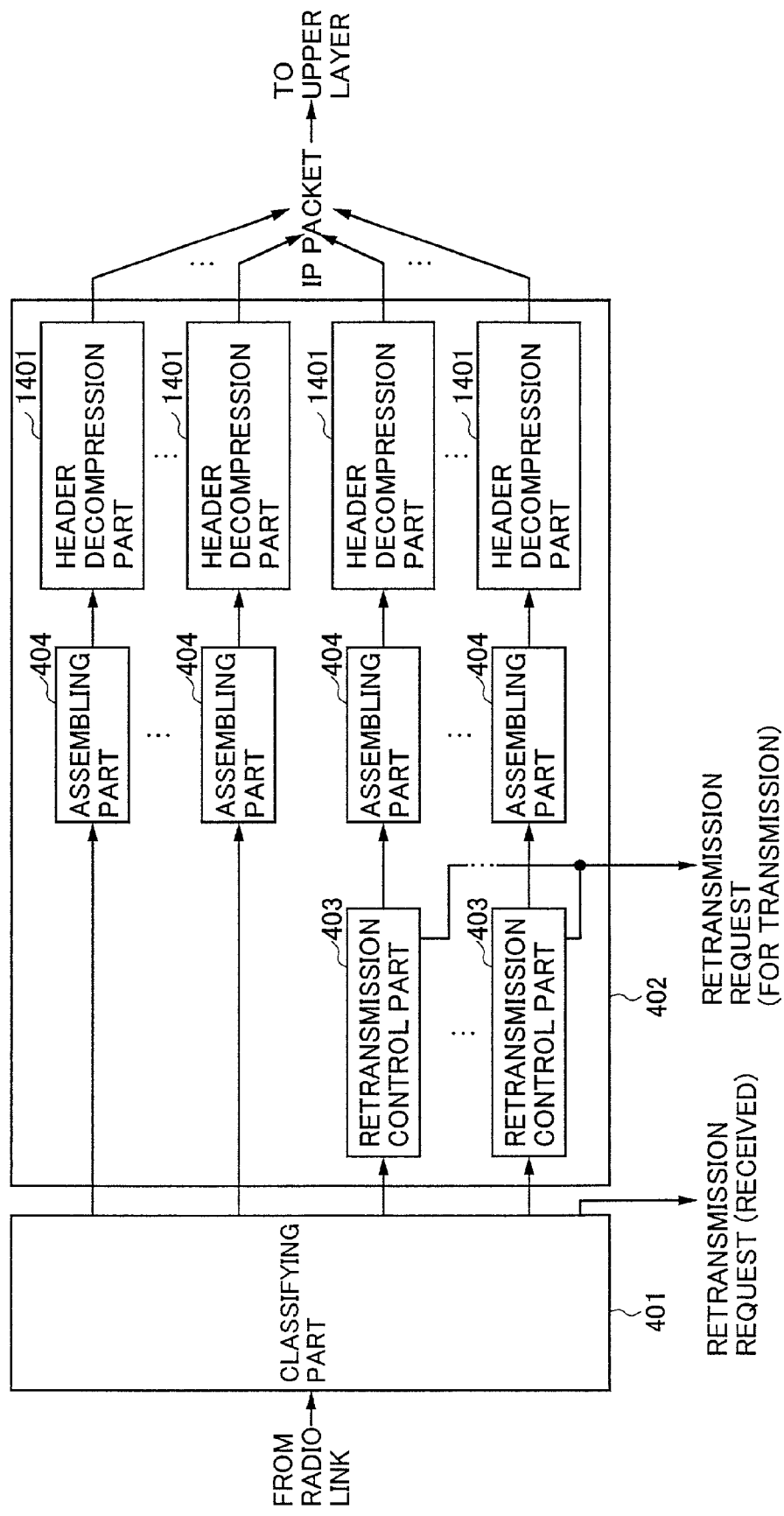
FIG. 14 is the schematic diagram showing the configuration of the packet receiving apparatus according to the third embodiment of the present invention.
Figure 15:
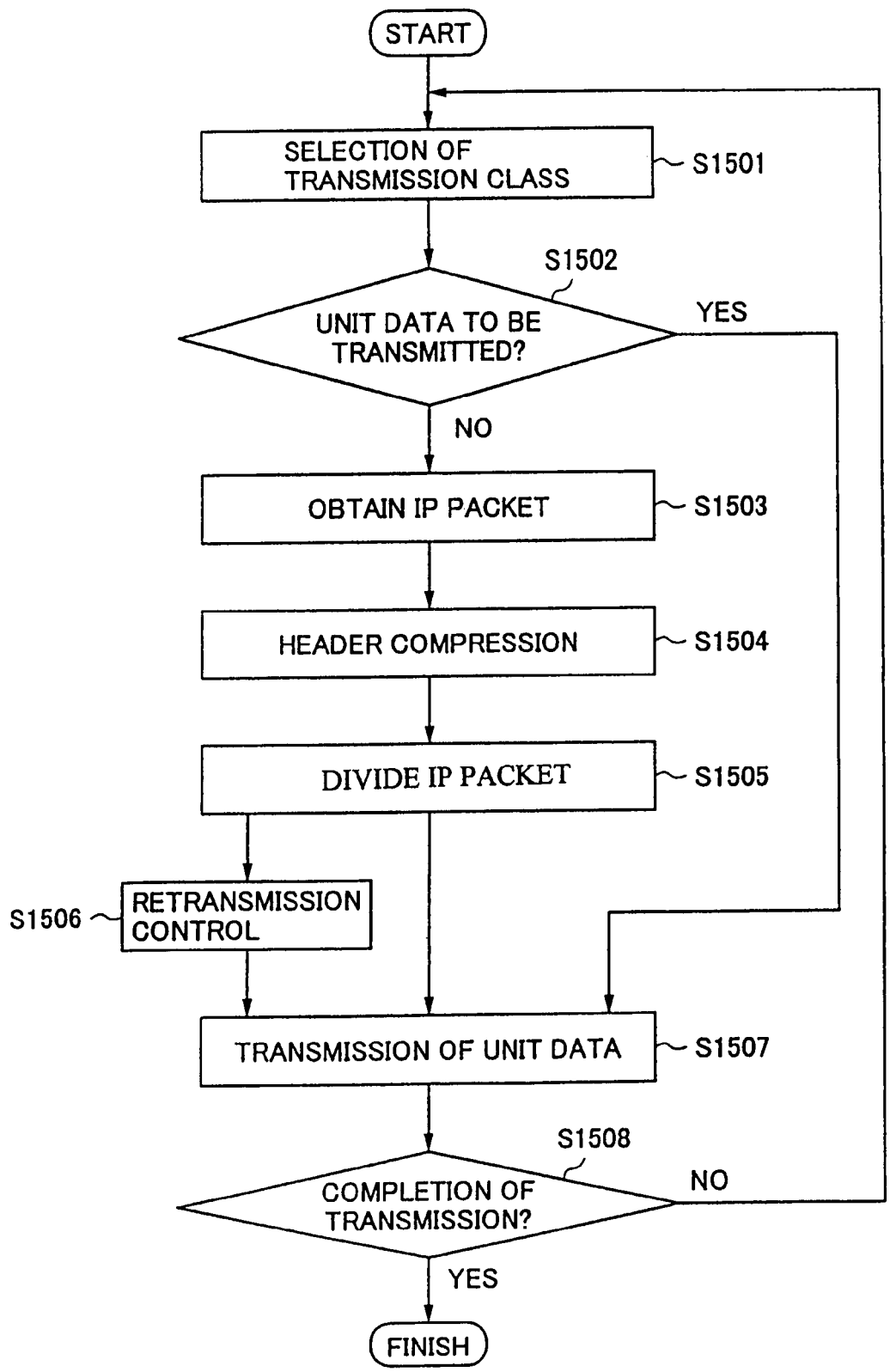
FIG. 15 is a process flow chart of the data unit transmission in the packet transmitting apparatus according to the third embodiment of the present invention.
Figure 16:
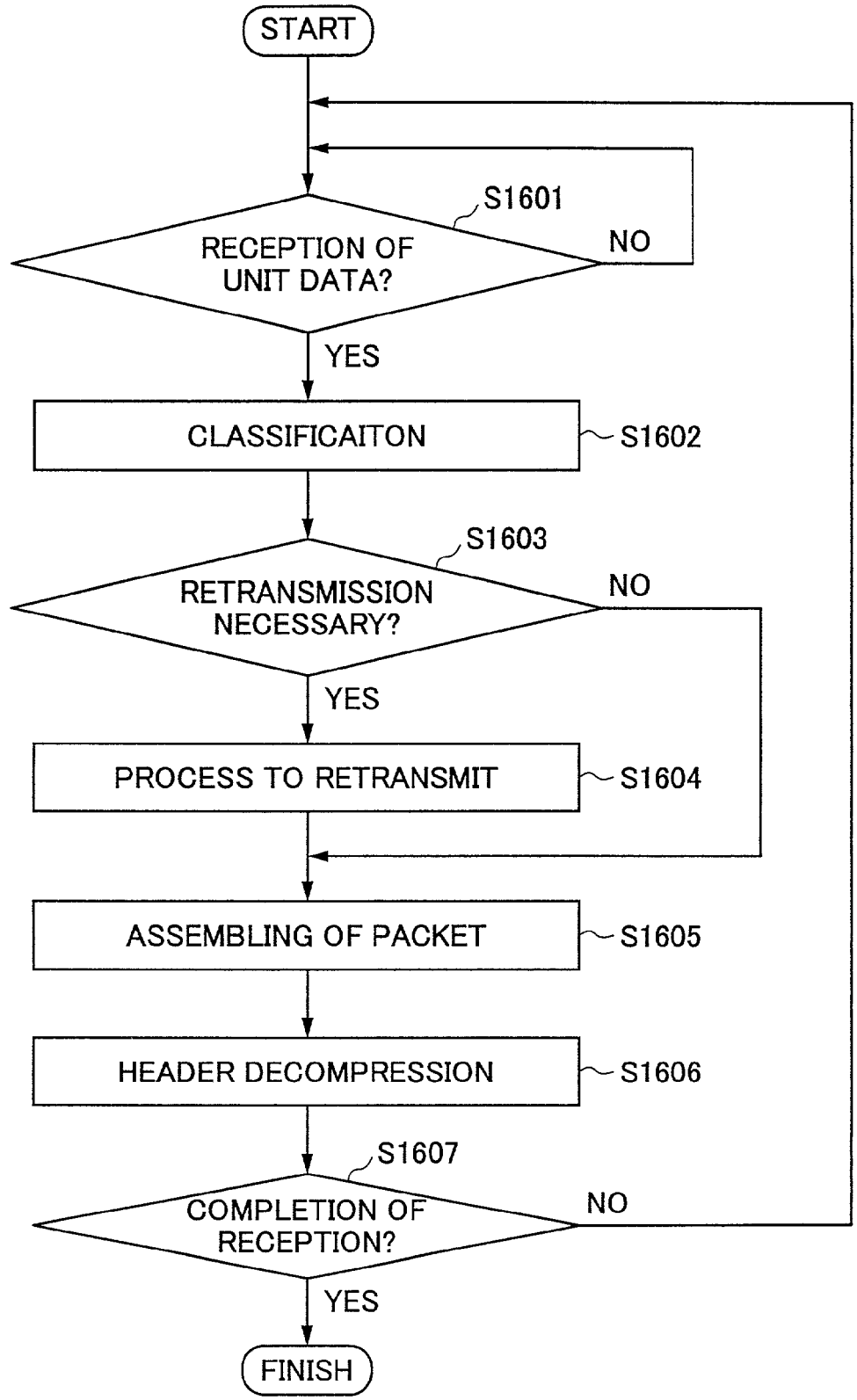
FIG. 16 is a process flow chart of the data unit reception in the packet receiving apparatus according to the third embodiment of the present invention.

FIG. 13 shows the configuration of the packet transmitting apparatus according to this embodiment, FIG. 14 shows the configuration of the packet receiving apparatus according to this embodiment, FIG. 15 shows the process of the data unit transmission in the packet transmitting apparatus according to this embodiment, and FIG. 16 shows the process of the data unit reception in the packet receiving apparatus according to this embodiment. The same elements as ones in the packet transmitting apparatus and the receiving apparatus according to the first embodiment shown in FIGS. 3–4 are indicated with the consistent reference numbers, and are not further described in detail.

First, the configuration of the packet transmitting apparatus according to this embodiment is described with reference to FIG. 13. In FIG. 13, each of header compressing parts 1301 performs the header compressing process to each of the IP packets input into the data link control part 303 before being divided into a plurality of the data units by the dividing part 304.

The header compression parts 1301 may employ arbitrary header compressing algorithm as the header compression process, such as RFC1144, RFC2507, and RFC2508 of IETF (Internet Engineering Task force), or RFC3095.

The headers to be compressed by the above header compression process may be IP header, TCP/IP header, UDP/IP header, or RTP/UDP/IP header.

In this embodiment, the dividing part 304 divides a header-compressed packet that is subject to the header compressing process into a plurality of the data units.

The configuration of the packet receiving apparatus according to this embodiment is then described with reference to FIG. 14. In FIG. 14, each of header decompression parts 1401 applies the process to decompress the compressed header to the header-compressed packets each assembled by the assembling parts 404 in order to reproduce the original IP packet. The decompressing process corresponds to the compressing algorithm in the transmitter-side.

The header-decompressed IP packet is transferred to the upper layer via, for example, a bus.

The process of the data unit transmission in the packet transmitting apparatus according to this embodiment is then described with reference to FIG. 15. The same processes as ones in the operation according to the first embodiment shown in FIG. 7 are not further described in detail.

As shown in FIG. 15, after the IP packet is obtained at S1503, the header compressing process is applied to the obtained IP packet by the header compressing part 1301 (S1504), and the dividing process is applied by the dividing part 304 (S1505).

The process of the data unit reception in the packet receiving apparatus according to this embodiment is then described with reference to FIG. 16. The same processes as ones in the operation according to the first embodiment shown in FIG. 8 are not further described in detail.

As shown in FIG. 16, after the header-compressed packet is assembled at S1605, the header decompressing process is applied to the assembled header-compressed packet by the header decompression part 1401 (S1606), and the decompressed IP packet is transferred to the upper layer.

Thus, according to this embodiment, not only can the delays in the real-time type packets be reduced as well as in the previous embodiments, but also the amount of the transmitted information can be reduced by employing the header compressing process.

Although the shown header compressing part is provided in each process lines, the above header compressing parts may be integrated into one element if the element can identify in which process line for the data unit or the IP packet are processed (or to which QoS class the data unit or the IP packet belongs). Similarly, although the shown header decompression part is provided in each process line, the above header decompression parts may be integrated into one element if the element can identify in which process line for the data unit or the IP packet are processed (or to which QoS class the data unit or the IP packet belongs).

The compressing algorithm used in this embodiment may be fixed uniquely to each apparatus at the design phase, or may be designed to support a plurality of algorithms and be set up by negotiating between nodes before the start of communication.

The packet transmission method and system according to the fourth embodiment of the present invention is now described with reference to FIG. 17. FIG. 17 shows the configuration of the packet transmitting apparatus according to this embodiment.

In FIG. 17, the pre-scheduling part 1701 processes each of the packets to be transmitted packet by packet on the basis of the QoS requirement, as with the conventional scheduling part such as the scheduling part 103 shown in FIG. 1.

The classifying part 1702 classifies the IP packets by outputting each of the pre-scheduled IP packets to different dividing parts 304 on the basis of the QoS requirement obtained from, for example, the IP header information of the IP packets, as with the classifying part 301 according to the first embodiment of the present invention (see FIG. 3).

Now, along the process flow, a section from the classifying part 301 to the pre-scheduling part 1701 is referred to as a first half section, and a section from the classifying part

1702 to the scheduling part 306 is referred to as a second half section. It is clear from the figure that the first half section of the packet transmitting apparatus according to this embodiment has the same configuration as one of the conventional packet transmitting apparatuses in FIG. 1.

Thus, according to this embodiment, not only the subsequently same process as one in the first embodiment of the present invention is achieved, but also this configuration is achieved by adding the classifying part 1702, the data link control part 303, and the scheduling part 306 to the conventional packet transmitting apparatus, thereby the packet transmitting apparatus can be easily manufactured and also modified.

Although the embodiments of the present invention are described as above, the number of the queues and the classes based on the QoS requirement shown in the figures are only illustrative and are not to be construed as limiting the scope of the present invention.

Also, in any of the above embodiments, it may be possible that only the data type packets are divided into the above-mentioned predetermined data units. In other words, it may be possible that the real-time type packets are not divided. This is because the waiting time to be transmitted for the real-time type packet is reduced and the delay is avoided when the length of the data type packets is not so long, and because the data type packets relatively allow some delay.

Similarly, it may be possible that only the data type packets of which data length is beyond the predetermined threshold are divided. It may be also possible that the data type packet and the real-time type packet are divided into respective unit packets having a different data length.

However, it is preferable to divide all the packets into the unit packets each having the same length in order to realize uniform processing.

Further, although it is mainly described in the above description that the packet transmitting apparatus and the packet receiving apparatus, or the packet transmitting/receiving apparatuses according to the present invention are provided within the nodes in the mobile communication system, the present invention is not limited to such aspects and may be applied to mobile stations that are in use for radio communication and transmits and receives the real-time type packets and the data type packets, because it is possible that the radio communication terminal simultaneously transmits or receives the real-time type packets such as video streaming and the data type packets such as E-mail. In this respect, the present invention may also be applied to nodes located in a wired network for use in wired packet transmission.

Further, although the above third embodiment is described and shown as an aspect that the header compressing/decompressing process is added to the aspect according to the first embodiment, the header compressing/decompressing process according to the present invention may be added to the aspect according to the above second or fourth embodiment.

Thus, it is clear from the above description that according to the present invention, the waiting time for real-time type packets to be transmitted can be reduced when the real-time type packet comes to be transmitted during transmission of the data type packet. In other words, even during transmission of the data type packet, the real-time type packet can be transmitted. Also, the data processing required in the data link control process can be reduced.

The present invention is not limited to the specifically disclosed embodiments, and variations and modifications may be made without departing from the scope of the invention.

What is claimed is:

1. A packet transmission method for transmitting packets classified according to a quality of service (QoS) requirement from a transmitting node to a receiving node, the packet transmission method comprising the steps of:
   in the transmitting node,
      selecting sequentially a QoS class;
      dividing each IP queued packet to be transmitted, which belongs to the selected class, into a plurality of predetermined data units, wherein a length of the predetermined data unit is set shorter than a length of an average size IP data packet;
      transmitting one of the predetermined data units; and
      applying a transmitter-side retransmission control process to the data unit to be transmitted when the selected class is a QoS class specified for data type packets;
   in the receiving node,
      receiving sequentially the data unit transmitted from the transmitting node;
      applying a receiver-side retransmission control process to the received data unit to be assembled when the received data unit belongs to one of the QoS classes specified for the data type packets; and
      assembling a plurality of received data units to restore an original packet in each QoS class.

2. The packet transmission method as claimed in claim 1, wherein:
   in the step of dividing, the queued packet to be transmitted is divided into a plurality of the data units only when there is no data unit which is not yet transmitted and belongs to the same QoS class as the queued packet to be transmitted.

3. The packet transmission method as claimed in claim 2, wherein:
   the transmitting node applies a header compression process to the queued packet to be transmitted in a predetermined manner, and divides the header-compressed packet into a plurality of the predetermined data units; and
   the receiving node applies to the assembled packet a header decompression process corresponding to the header compression process.

4. The packet transmission method as claimed in claim 1, wherein:
   in the step of dividing, the queued packet to be transmitted is divided into a plurality of the data units and stored; and
   in the step of transmitting, one of the data units belonging to the selected class from the stored data units is transmitted.

5. The packet transmission method as claimed in claim 4, wherein:
   the transmitting node applies a header compression process to the queued packet to be transmitted in a predetermined manner, and divides the header-compressed packet into a plurality of the predetermined data units; and
   the receiving node applies to the assembled packet a header decompression process corresponding to the header compression process.

6. The packet transmission method as claimed in claim 1, wherein:
the transmitting node applies a header compression process to the queued packet to be transmitted in a predetermined manner, and divides the header-compressed packet into a plurality of the predetermined data units; and
the receiving node applies to the assembled packet a header decompression process corresponding to the header compression process.

7. A packet transmission system for transmitting packets classified according to a QoS requirement from a transmitting node to a receiving node, wherein,
the transmitting node comprises:
a dividing part provided for each of QoS classes for dividing each IP packet to be transmitted into a plurality of predetermined data units in each of QoS classes, wherein a length of the predetermined data unit is set shorter than a length of an average size IP data packet;
a transmitter-side retransmission control part for applying a transmitter-side retransmission control process to the data unit that belongs to one of QoS classes specified for data type packets and is one of the data units obtained from the dividing part; and
a scheduling part for selecting a data unit to be transmitted from a set of data units including a data unit that belongs to one of QoS classes specified for real time packets and is obtained from the dividing part, and a data unit that belongs to one of the QoS classes specified for data type packets and is obtained from the transmitter-side retransmission control part, and for transmitting the selected data unit, and
the receiving node comprises:
a receiver-side retransmission control part for applying a receiver-side retransmission control process to the data unit that belongs to one of the QoS classes specified for data type packets and is one of the received data units;
an assembling part for assembling in each QoS class plural data units of the received data units, which belong to one of the QoS classes specified for real time packets, and the data units obtained from the receiver-side retransmission control part, which belong to one of the QoS classes specified for data type packets, in order to restore an original packet.

8. The packet transmission system as claimed in claim 7, wherein:
the transmitting node further comprises a header compressing part for applying a header compression process in a predetermined manner to the packet to be transmitted;
the receiving node further comprises a header decompression part;
the dividing part divides a header-compressed packet obtained from the header compressing part into a plurality of the predetermined data units;
the assembling part applies the assembling process to the plurality of the predetermined data units to decompress the header-compressed packet; and
the header decompression part applies a header decompression process, which corresponds to the header compression process in the header compressing part, to the header-compressed packet obtained from the assembling part in order to restore an original packet.

9. A packet transmission system for transmitting packets classified according to a QoS requirement from a transmitting node to a receiving node, wherein,
the transmitting node comprises:
a first pre-scheduling part for selecting classes having high priority for transmission from QoS classes specified for data type packets;
a second pre-scheduling part for selecting classes having high priority for transmission from QoS classes specified for real time packets;
a first dividing part for dividing each IP queued packet to be transmitted, which belongs to the QoS class selected by the first pre-scheduling part, into a plurality of predetermined data units, wherein a length of the predetermined data unit is set shorter than a length of an average size IP data packet;
a second dividing part for dividing each queued packet to be transmitted, which belongs to the QoS class selected by the second pre-scheduling part, into a plurality of the predetermined data units;
a transmitter-side retransmission control part for applying a transmitter-side retransmission control process to the packet to be transmitted to be divided by the first dividing part; and
a scheduling part for selecting either one of the QoS classes specified for data type packets or one of the QoS classes specified for real time packets to be transmitted, for transmitting the data unit obtained from the transmitter-side retransmission control part when the QoS class specified for data type packets is selected, and for transmitting the data unit obtained from the second dividing part when the QoS class specified for real time packets is selected, and
the receiving node comprises:
a receiver-side retransmission control part for applying a receiver-side retransmission control process to the data unit that belongs to one of the QoS classes specified for data type packets and is one of the received data units; and
an assembling part for assembling in each QoS class plural data units of the received data units, which belong to one of the QoS classes specified for real time packets, and the data units obtained from the receiver-side retransmission control part, which belong to one of the QoS classes specified for data type packets, in order to restore an original packet.

10. The packet transmission system as claimed in claim 9, wherein:
the transmitting node further comprises a header compressing part for applying a header compression process in a predetermined manner to the packet to be transmitted;
the receiving node further comprises a header decompression part;
the dividing part divides a header-compressed packet obtained from the header compressing part into a plurality of the predetermined data units;
the assembling part applies the assembling process to the plurality of the predetermined data units in order to decompress the header-compressed packet; and
the header decompression part applies a header decompression process, which corresponds to the header compression process in the header compressing part, to the header-compressed packet obtained from the assembling part in order to restore an original packet.

11. A packet transmission system for transmitting packets classified according to a QoS requirement from a transmitting node to a receiving node, wherein, the transmitting node comprises:
a first scheduling part for determining transmission order for packets to be transmitted;
a dividing part provided for each QoS class for dividing each IP packet to be transmitted, of which transmission order is determined by the first scheduling part, into a plurality of predetermined data units in QoS class, wherein a length of the predetermined data unit is set shorter than a length of an average size IP data packet;
a transmitter-side retransmission control part for applying a transmitter-side retransmission control process to the data unit that belongs to one of QoS classes specified for data type packets and is one of the data units obtained from the dividing part; and
a scheduling part for selecting a data unit to be transmitted from a set of data units including a data unit that belongs to one of QoS classes specified for real time packets and is obtained from the dividing part, and a data unit that belongs to one of the QoS classes specified for data type packets and is obtained from the transmitter-side retransmission control part, and for transmitting the selected data unit, and the receiving node comprises:
a receiver-side retransmission control part for applying a receiver-side retransmission control process to the data unit that belongs to one of the QoS classes specified for data type packets and is one of the received data units;
an assembling part for assembling in each QoS class plural data units of the received date units, which belong to one of the QoS classes specified for real time packets, and the data units obtained from the receiver-side retransmission control part, which belong to one of the QoS classes specified for data type packets, in order to restore an original packet.

12. The packet transmission system as claimed in claim 11, wherein:
the transmitting node further comprises a header compressing part for applying a header compression process in a predetermined manner to the packet to be transmitted;
the receiving node further comprises a header decompression part;
the dividing part divides a header-compressed packet obtained from the header compressing part into a plurality of the predetermined data units;
the assembling part applies the assembling process to the plurality of the predetermined data units in order to decompress the header-compressed packet; and
the header decompression part applies a header decompression process, which corresponds to the header compression process in the header compressing part, to the header-compressed packet obtained from the assembling part in order to restore an original packet.

13. A packet transmitting/receiving apparatus comprising a transmitting part and a receiving part for transmitting and receiving the packets classified according to a QoS requirement respectively, wherein,
the transmitting part comprises:
a dividing part provided for each QoS class for dividing each IP packet to be transmitted into a plurality of predetermined data units in each QoS class, wherein a length of the predetermined data unit is set shorter than a length of an average size IP data packet;
a transmitter-side retransmission control part for applying a transmitter-side retransmission control process to the data unit that belongs to one of QoS classes specified for data type packets and is one of the data units obtained from the dividing part; and
a scheduling part for selecting a data unit to be transmitted from a set of data units including a data unit that belongs to one of QoS classes specified for real time packets and is obtained from the dividing part, and a data unit that belongs to one of the QoS classes specified for data type packets and is obtained from the transmitter-side retransmission control part, and for transmitting the selected data unit,
the receiving part comprises:
a receiver-side retransmission control pan for applying a receiver-side retransmission control process to the data unit that belongs to one of the QoS classes specified for data type packets and is one of the received data units;
an assembling part for assembling in each of QoS classes plural data units of the received data units, which belong to one of the QoS classes specified for real time packets, and the data units obtained from the receiver-side retransmission control part, which belong to one of the QoS classes specified for data type packets, in order to restore an original packet,
the receiver-side retransmission control part generates a retransmission request control signal to indicate a data unit requested to be retransmitted to another packet transmitting/receiving apparatus communicating with the packet transmitting/receiving apparatus,
the scheduling part performs a scheduling process on the retransmission request control signals with the data unit to be transmitted,
the transmitting part further comprises:
a classifying part for classifying and outputting the retransmission request control signals transmitted from the opposing packet transmitting/receiving apparatus into the transmitter-side retransmission control part, and
the transmitter-side retransmission control part outputs to the scheduling part the data unit indicated by the retransmission request control signal transmitted from the opposing packet transmitting/receiving apparatus upon the retransmission request control signal being input.

14. The packet transmitting/receiving apparatus as claimed in claim 13, wherein:
the transmitting part further comprises a header compressing part for applying a header compression process in a predetermined manner to the packet to be transmitted;
the receiving part further comprises a header decompression part;
the dividing part divides a header-compressed packet obtained from the header compressing part into a plurality of the predetermined data units;
the assembling part applies the assembling process to the plurality of the predetermined data units in order to decompress the header-compressed packet; and
the header decompression part applies a header decompression process, which corresponds to the header compression process in the header compressing part, to the header-compressed packet obtained from the assembling part in order to restore an original packet.

15. A packet transmitting/receiving apparatus comprising a transmitting part and a receiving part for transmitting and receiving packets classified according to a QoS requirement respectively, wherein, the transmitting part comprises:
- a first pre-scheduling part for selecting classes having high priority for transmission from QoS classes specified for data type packets;
- a second pre-scheduling part for selecting classes having high priority for transmission from QoS classes specified for real time packets;
- a first dividing part for dividing each IP queued packet to be transmitted, which belongs to the QoS class selected by the first pre-scheduling part, into a plurality of predetermined data units, wherein a length of the predetermined data unit is set shorter than a length of an average size IP data packet;
- a second dividing part for dividing each IP queued packet to be transmitted, which belongs to the QoS class selected by the second pre-scheduling part, into a plurality of the predetermined data units;
- a transmitter-side retransmission control part for applying a transmitter-side retransmission control process to the packet to be transmitted to be divided by the first dividing part; and
- a scheduling part for selecting either one of the QoS classes specified for data type packets or one of the QoS classes specified for real time packets to be transmitted, for transmitting the data unit obtained from the transmitter-side retransmission control part when the QoS class specified for data type packets is selected, and for transmitting the data unit obtained from the second dividing part when the QoS class specified for real time packets is selected, and the receiving node comprises:
- a receiver-side retransmission control part for applying a receiver-side retransmission control process to the data unit that belongs to one of the QoS classes specified for data type packets and is one of the received data units;
- an assembling part for assembling in each QoS class plural data units of the received data units, which belong to one of the QoS class specified for real time packets, and the data units obtained from the receiver-side retransmission control part, which belong to one of the QoS classes specified for data type packets, in order to restore an original packet,
- the receiver-side retransmission control part generates a retransmission request control signal to indicate a data unit requested to be retransmitted to another packet transmitting/receiving apparatus communicating with the packet transmitting/receiving apparatus,
- the scheduling part performs a scheduling process on the retransmission request control signals with the data unit to be transmitted,
- the transmitting part further comprises the classifying part for classifying and outputting the retransmission request control signals transmitted from the opposing packet transmitting/receiving apparatus into the transmitter-side retransmission control part, and
- the transmitter-side retransmission control part outputs to the scheduling part the data unit indicated by the retransmission request control signal transmitted from the opposing packet transmitting/receiving apparatus upon the retransmission request control signal being input.

16. The packet transmitting/receiving apparatus as claimed in claim 15, wherein:
- the transmitting part further comprises a header compressing part for applying a header compression process in a predetermined manner to the packet to be transmitted;
- the receiving part further comprises a header decompression part;
- the dividing part divides a header-compressed packet obtained from the header compressing part into a plurality of the predetermined data units;
- the assembling part applies the assembling process to the plurality of the predetermined data units in order to decompress the header-compressed packet; and
- the header decompression part applies a header decompression process, which corresponds to the header compression process in the header compressing part, to the header-compressed packet obtained from the assembling part in order to restore an original packet.

17. A packet transmitting/receiving apparatus comprising a transmitting part and a receiving part for transmitting and receiving packets classified according to a QoS requirement respectively, wherein, the transmitting part comprises:
- a first scheduling part for determining transmission order for packets to be transmitted;
- a dividing part provided for each QoS class for dividing each IP packet to be transmitted, of which transmission order is determined by the first scheduling part, into a plurality of predetermined data units in each QoS class, wherein a length of the predetermined data unit is set shorter than a length of an average size IP data packet;
- a transmitter-side retransmission control part for applying a transmitter-side retransmission control process to the data unit that belongs to one of QoS classes specified for data type packets and is one of the data units obtained from the dividing part; and
- a scheduling part for selecting a data unit to be transmitted from a set of data units including a data unit that belongs to one of QoS classes specified for real time packets and is obtained from the dividing part, and a data unit that belongs to one of the QoS classes specified for data type packets and is obtained from the transmitter-side retransmission control part, according to the QoS requirement, and for transmitting the selected data unit, the receiving part comprises:
- a receiver-side retransmission control part for applying a receiver-side retransmission control process to the data unit that belongs to one of the QoS classes specified for data type packets and is one of the received data units;
- an assembling part for assembling in each QoS class plural data units of the received data units, which belong to one of the QoS classes specified for real time packets, and the data units obtained from the receiver-side retransmission control part, which belong to one of the QoS classes specified for data type packets, in order to restore an original packet,
- the receiver-side retransmission control part generates a retransmission request control signal to indicate a data unit requested to be retransmitted to another packet transmitting/receiving apparatus communicating with the packet transmitting/receiving apparatus,
- the scheduling part performs a scheduling process on the retransmission request control signals with the data unit to be transmitted, the transmitting part further comprises:
the classifying part for classifying and outputting the retransmission request control signals transmitted from the opposing packet transmitting/receiving apparatus into the transmitter-side retransmission control part, and
the transmitter-side retransmission control part outputs to the scheduling part the data unit indicated by the retransmission request control signal transmitted from the opposing packet transmitting/receiving apparatus upon the retransmission request control signal being input.

18. The packet transmitting/receiving apparatus as claimed in claim 17, wherein:
the transmitting part further comprises a header compressing part for applying a header compression process in a predetermined manner to the packet to be transmitted;
the receiving part further comprises a header decompression part;
the dividing part divides a header-compressed packet obtained from the header compressing part into a plurality of the predetermined data units;
the assembling part applies the assembling process to the plurality of the predetermined data units in order to decompress the header-compressed packet; and
the header decompression part applies a header decompression process, which corresponds to the header compression process in the header compressing part, to the header-compressed packet obtained from the assembling part in order to restore an original packet.

19. A packet transmitting apparatus for transmitting packets classified according to a QoS requirement, the packet transmitting apparatus comprising:
a dividing part provided for each QoS class for dividing each IP packet to be transmitted into a plurality of predetermined data units in each QoS class, wherein a length of the predetermined data unit is set shorter than a length of an average size IP data packet;
a transmitter-side retransmission control part for applying a transmitter-side retransmission control process to the data unit that belongs to one of QoS classes specified for data type packets and is one of the data units obtained from the dividing part; and
a scheduling part for selecting a data unit to be transmitted from a set of data units including a data unit that belongs to one of QoS classes specified for real time packets and is obtained from the dividing part, and a data unit that belongs to one of the QoS classes specified for data type packets and is obtained from the transmitter-side retransmission control part, and for transmitting the selected data unit.

20. The packet transmitting apparatus as claimed in claim 19, wherein:
the packet transmitting apparatus further comprises a header compressing part for applying a header compression process in a predetermined manner to the packet to be transmitted; and
the dividing part divides a header-compressed packet obtained from the header compressing part into a plurality of the predetermined data units.

21. A packet transmitting apparatus for transmitting packets classified according to a QoS requirement, the packet transmitting apparatus comprising:
a first pre-scheduling part for selecting classes having high priority for transmission from QoS classes specified for data type packets;
a second pre-scheduling part for selecting classes having high priority for transmission from QoS classes specified for real time packets;
a first dividing part for dividing each IP queued packet to be transmitted, which belongs to the QoS class selected by the first pre-scheduling part, into a plurality of predetermined data units, wherein a length of the predetermined data unit is set shorter than a length of an average size IP data packet;
a second dividing part for dividing each queued packet to be transmitted, which belongs to the QoS class selected by the second pre-scheduling part, into a plurality of the predetermined data units;
a transmitter-side retransmission control part for applying a transmitter-side retransmission control process to the packet to be transmitted to be divided by the first dividing part; and
a scheduling part for selecting either one of the QoS classes specified for data type packets or one of the QoS classes specified for real time packets to be transmitted, for transmitting the data unit obtained from the transmitter-side retransmission control part when the QoS class specified for data type packets is selected, and for transmitting the data unit obtained from the second dividing part when the QoS class specified for real time packets is selected.

22. The packet transmitting apparatus as claimed in claim 21, wherein:
the packet transmitting apparatus further comprises a header compressing part for applying a header compression process in a predetermined manner to the packet to be transmitted;
the dividing part divides a header-compressed packet obtained from the header compressing part into a plurality of the predetermined data units.

23. A packet transmitting apparatus for transmitting packets classified according to a QoS requirement, the packet transmitting apparatus comprising:
a first scheduling part for determining transmission order for packets to be transmitted;
a dividing part provided for each of QoS class for dividing each IP packet to be transmitted, of which transmission order is determined by the first scheduling part, into a plurality of predetermined data units in each QoS class, wherein a length of the predetermined data unit is set shorter than a length of an average size IP data packet;
a transmitter-side retransmission control part for applying a transmitter-side retransmission control process to the data unit that belongs to one of QoS classes specified for data type packets and is one of the data units obtained from the dividing part; and
a scheduling part for selecting a data unit to be transmitted from a set of data units including a data unit that belongs to one of QoS classes specified for real time packets and is obtained from the dividing part, and a data unit that belongs to one of the QoS classes specified for data type packets and is obtained from the transmitter-side retransmission control part, according to the QoS requirement, and for transmitting the selected data unit.

24. The packet transmitting apparatus as claimed in claim 23, wherein:
the packet transmitting apparatus further comprises a header compressing part for applying a header compression process in a predetermined manner to the packet to be transmitted;
the dividing part divides a header-compressed packet obtained from the header compressing part into a plurality of the predetermined data units.

* * * * *